(12) United States Patent
Imai

(10) Patent No.: US 7,619,796 B2
(45) Date of Patent: Nov. 17, 2009

(54) OPTICAL SCANNING DEVICE AND IMAGE FORMING APPARATUS

(75) Inventor: Shigeaki Imai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 12/394,732

(22) Filed: Feb. 27, 2009

(65) Prior Publication Data

US 2009/0231654 A1 Sep. 17, 2009

(30) Foreign Application Priority Data

Mar. 11, 2008 (JP) ............................. 2008-061860

(51) Int. Cl.
 *G02B 26/08* (2006.01)
(52) U.S. Cl. ............. 359/196.1; 359/205.1; 359/212.1; 359/216.1; 347/232; 347/259
(58) Field of Classification Search ............ None
 See application file for complete search history.

(56) References Cited

U.S. PATENT DOCUMENTS

| 6,384,949 | B1 | 5/2002 | Suzuki |
| 6,813,051 | B2 | 11/2004 | Suzuki et al. |
| 7,277,212 | B2 | 10/2007 | Miyatake et al. |
| 7,304,660 | B2 * | 12/2007 | Kuribayashi ................ 347/256 |
| 7,355,770 | B2 | 4/2008 | Miyatake et al. |
| 2004/0240000 | A1 | 12/2004 | Miyatake et al. |
| 2005/0190420 | A1 | 9/2005 | Imai et al. |
| 2006/0158711 | A1 | 7/2006 | Imai et al. |
| 2007/0058255 | A1 | 3/2007 | Imai et al. |
| 2007/0236557 | A1 | 10/2007 | Imai et al. |
| 2008/0019255 | A1 | 1/2008 | Imai et al. |
| 2008/0068678 | A1 | 3/2008 | Suzuki et al. |
| 2008/0170283 | A1 | 7/2008 | Imai |
| 2008/0192323 | A1 | 8/2008 | Nakamura et al. |
| 2008/0259426 | A1 | 10/2008 | Imai |
| 2009/0073529 | A1 | 3/2009 | Imai |

FOREIGN PATENT DOCUMENTS

| JP | 4-171415 | 6/1992 |
| JP | 9-64444 | 3/1997 |

(Continued)

OTHER PUBLICATIONS

U.S. Appl. No. 12/396,813, filed Mar. 3, 2009, Imai.

(Continued)

*Primary Examiner*—James Phan
(74) *Attorney, Agent, or Firm*—Oblon, Spivak, McClelland, Maier & Neustadt, L.L.P.

(57) ABSTRACT

An aperture has an aperture opening that transmits a predetermined portion of a light beam. A phase optical element changes a phase of a portion of a light beam. A scanning lens focuses the light beam into a beam spot on a scanning surface. The phase optical element has a function of increasing light intensity of a side-lobe of the scanning beam near the scanning surface. The aperture opening is set to satisfy $0.03 \leq (SR-SA)/SR \leq 0.20$, where SR and SA are areas of a rectangle circumscribing the aperture opening and the aperture opening, respectively. The function of the phase optical element and the aperture expand a depth allowance of the beam spot.

20 Claims, 22 Drawing Sheets

FOREIGN PATENT DOCUMENTS

| | | |
|---|---|---|
| JP | 2685252 | 8/1997 |
| JP | 10-227992 | 8/1998 |
| JP | 2002-6247 | 1/2002 |
| JP | 3507244 | 12/2003 |
| JP | 2005-266258 | 9/2005 |
| JP | 3920487 | 2/2007 |

OTHER PUBLICATIONS

U.S. Appl. No. 12/174,899, filed Jul. 17, 2008, Saisho, et al.

U.S. Appl. No. 07/366,170, filed Jun. 14, 1989, Itabashi.

\* cited by examiner

FIG. 3
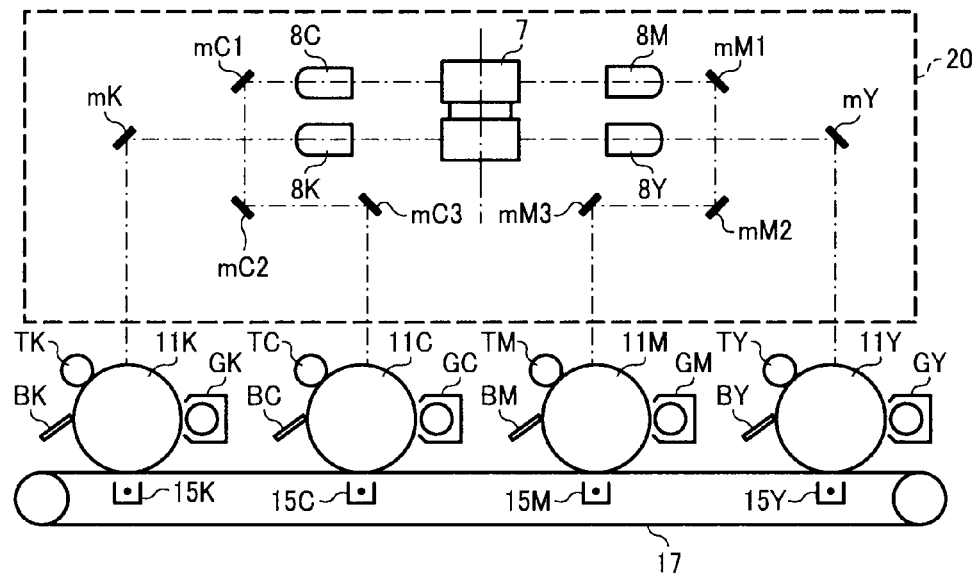
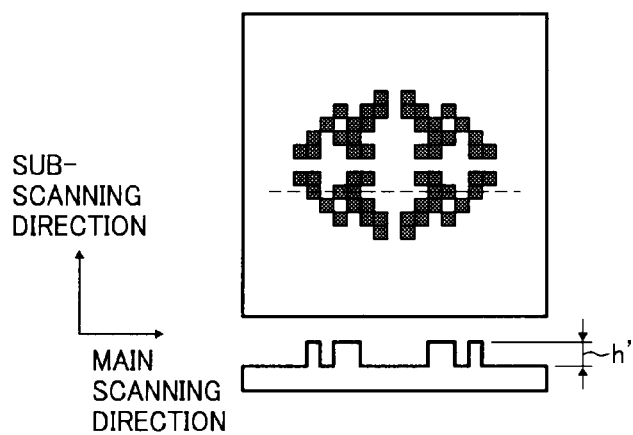
FIG. 4A
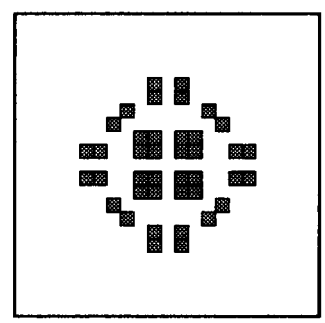
FIG. 4B
SUB-
SCANNING
DIRECTION
MAIN
SCANNING
DIRECTION
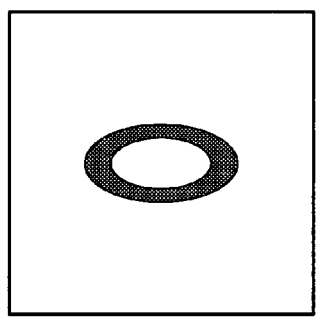
FIG. 4C
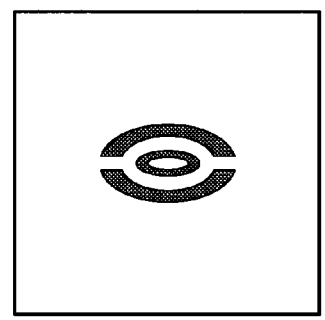
FIG. 4D 210, 390, 690, 750, 930 μm
IN ORDER FROM SMALLEST DIAMETER

|  | SIDE-LOBE PEAK INTENSITY [%] | DEPTH ALLOWANCE [mm] | BEAM SPOT SIZE [μm] |
|---|---|---|---|
| WITHOUT DEPTH EXPANDING ELEMENT | 1.6 | 8.9 | 56.4 |
| DEPTH EXPANDING ELEMENT 1 | 10.4 | 18.0 | 48.1 |
| DEPTH EXPANDING ELEMENT 2 | 9.6 | 15.0 | 47.7 |
| DEPTH EXPANDING ELEMENT 3 | 8.1 | 13.8 | 50.7 |
| DEPTH EXPANDING ELEMENT 4 | 5.8 | 12.9 | 51.8 |
| DEPTH EXPANDING ELEMENT 5 | 3.8 | 11.2 | 53.3 |
| CONVENTIONAL DEPTH EXPANDING ELEMENT | 0.6 | 6.4 | 58.4 |

ORm=Om/Am
ORs=Os/As ny=2, nz=6 ny=6, nz=2 ny=8.2, nz=3.6

FIG. 21
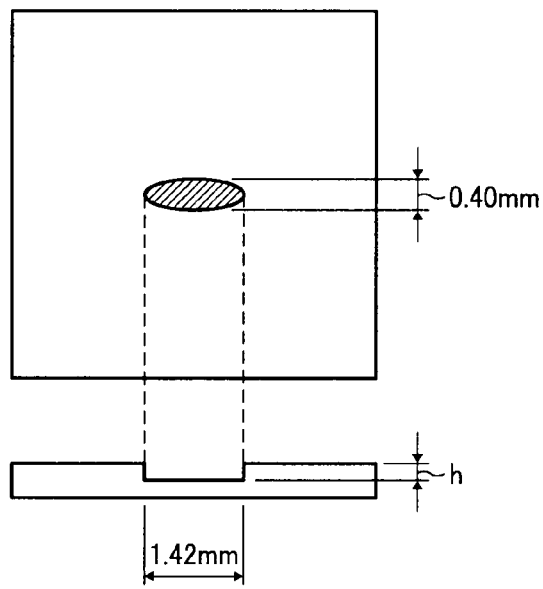
FIG. 22A
RECTANGULAR APERTURE
OPENING ($\alpha=0$)
FIG. 22B
ELLIPTICAL APERTURE
OPENING ($\alpha=21.5$)
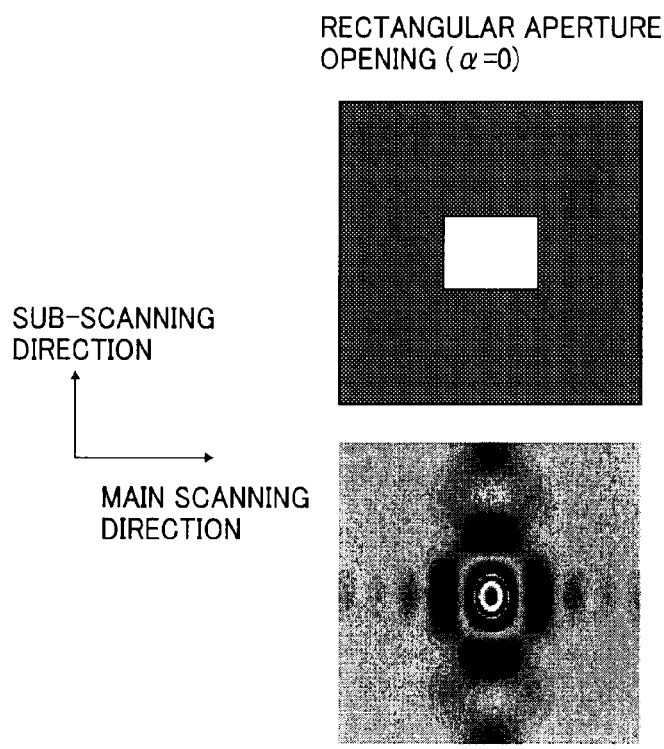
SUB-SCANNING
DIRECTION
MAIN SCANNING
DIRECTION
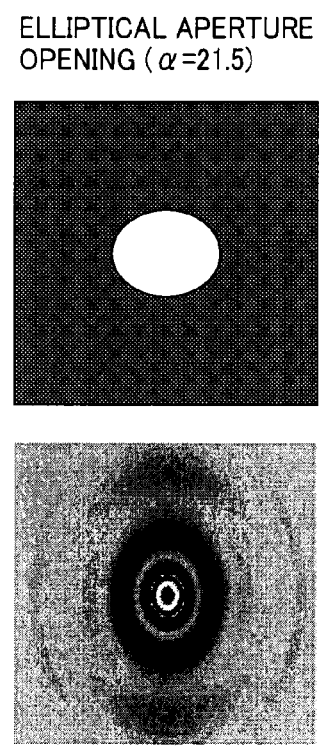

APERTURE OPENING OF
TYPE A ($\alpha$=16.6)

APERTURE OPENING OF
TYPE B ($\alpha$=11.5)

APERTURE OPENING OF
TYPE C ($\alpha$=14.5)

APERTURE OPENING OF
TYPE D ($\alpha$=11.6)

FIG. 23

| APERTURE OPENING SHAPE | PHASE TYPE OPTICAL ELEMENT | MAIN SCANNING WIDTH [mm] | SUB-SCANNING WIDTH [mm] | α [%] | BEAM SPOT SIZE [μm] | BEAM SPOT SIZE (SUB-SCANNING WIDTH+8mm) [μm] | AMOUNT OF INCREASE IN BEAM SPOT SIZE [μm] | SIDE-LOBE PEAK [%] |
|---|---|---|---|---|---|---|---|---|
| RECTANGLE | NOT USED | 3.36 | 2.70 | 0 | 69.9 | 116.3 | 46.4 | 1.9 |
| ELLIPSE | NOT USED | 3.80 | 3.20 | 21.4 | 70.8 | 109.1 | 38.3 | 0.4 |
| RECTANGLE | USED | 3.10 | 2.40 | 0 | 69.9 | 148.8 | 78.9 | 11.0 |
| ELLIPSE | USED | 3.56 | 2.90 | 21.4 | 69.7 | 83.4 | 13.7 | 5.2 |

FIG. 24

| APERTURE OPENING SHAPE | PHASE TYPE OPTICAL ELEMENT | ARm [mm] | ARs [mm] | AEm [mm] | AEs [mm] | α [%] | BEAM SPOT SIZE [μm] | BEAM SPOT SIZE (SUB-SCANNING WIDTH+8mm) [μm] | AMOUNT OF INCREASE IN BEAM SPOT SIZE [μm] | SIDE-LOBE PEAK [%] |
|---|---|---|---|---|---|---|---|---|---|---|
| TYPE A | USED | 2.60 | 2.60 | 3.50 | 2.60 | 13.9 | 70.0 | 81.5 | 11.5 | 5.8 |
| TYPE A | USED | 2.98 | 2.30 | 3.40 | 2.76 | 16.6 | 69.6 | 78.3 | 8.7 | 7.2 |
| TYPE A | USED | 3.34 | 1.86 | 2.84 | 2.96 | 20.1 | 70.0 | 80.7 | 10.7 | 6.8 |

FIG. 25

| APERTURE OPENING SHAPE | PHASE TYPE OPTICAL ELEMENT | Am [mm] | As [mm] | Sm [mm] | Ss [mm] | α [%] | BEAM SPOT SIZE [μm] | BEAM SPOT SIZE (SUB-SCANNING WIDTH+8mm) [μm] | AMOUNT OF INCREASE IN BEAM SPOT SIZE [μm] | SIDE-LOBE PEAK [%] |
|---|---|---|---|---|---|---|---|---|---|---|
| TYPE B | USED | 3.24 | 2.58 | 0.1 | 0.2 | 9.1 | 70.1 | 74.8 | 4.7 | 9.7 |
| TYPE B | USED | 3.28 | 2.64 | 0.1 | 0.3 | 11.5 | 70.2 | 75.4 | 5.2 | 9.2 |
| TYPE B | USED | 3.28 | 2.72 | 0.0 | 0.5 | 12.9 | 70.3 | 76.2 | 5.9 | 8.7 |
| TYPE B | USED | 3.46 | 2.76 | 0.5 | 0.2 | 16.7 | 69.6 | 79.5 | 9.9 | 6.7 |
| TYPE B | USED | 3.44 | 2.80 | 0.2 | 0.5 | 18.1 | 70.1 | 79.1 | 9.0 | 7.0 |
| TYPE B | USED | 3.44 | 2.86 | 0.1 | 0.7 | 19.5 | 70.0 | 80.3 | 10.3 | 6.5 |

FIG. 26

| APERTURE OPENING SHAPE | PHASE TYPE OPTICAL ELEMENT | Am [mm] | As [mm] | ORm [mm] | ORs [mm] | α [%] | BEAM SPOT SIZE [μm] | BEAM SPOT SIZE (SUB-SCANNING WIDTH+8mm) [μm] | AMOUNT OF INCREASE IN BEAM SPOT SIZE [μm] | SIDE-LOBE PEAK [%] |
|---|---|---|---|---|---|---|---|---|---|---|
| TYPE C | USED | 3.12 | 2.50 | 0.7 | 0.8 | 3.6 | 69.4 | 74.1 | 4.7 | 10.2 |
| TYPE C | USED | 3.16 | 2.52 | 0.5 | 0.8 | 6.1 | 69.9 | 74.5 | 4.6 | 10.0 |
| TYPE C | USED | 3.20 | 2.62 | 0.4 | 0.7 | 9.6 | 70.1 | 75.5 | 5.4 | 9.2 |
| TYPE C | USED | 3.30 | 2.76 | 0.3 | 0.6 | 14.5 | 69.9 | 78.4 | 8.5 | 7.6 |
| TYPE C | USED | 3.42 | 2.84 | 0.3 | 0.5 | 18.1 | 70.3 | 81.5 | 11.2 | 6.1 |
| TYPE C | USED | 3.36 | 2.96 | 0.2 | 0.5 | 20.4 | 69.6 | 81.9 | 12.3 | 6.1 |

FIG. 27

| APERTURE OPENING SHAPE | PHASE TYPE OPTICAL ELEMENT | ny | nz | Am [mm] | As [mm] | α [%] | BEAM SPOT SIZE [μm] | BEAM SPOT SIZE (SUB-SCANNING WIDTH±8mm) [μm] | AMOUNT OF INCREASE IN BEAM SPOT SIZE [μm] | SIDE-LOBE PEAK [%] |
|---|---|---|---|---|---|---|---|---|---|---|
| TYPE D | USED | 8.0 | 8.0 | 3.10 | 2.46 | 2.1 | 69.6 | 111.4 | 41.8 | 10.5 |
| TYPE D | USED | 4.0 | 4.0 | 3.24 | 2.58 | 7.4 | 69.4 | 75.5 | 6.1 | 9.0 |
| TYPE D | USED | 4.4 | 2.0 | 3.30 | 2.70 | 11.6 | 69.5 | 76.9 | 7.4 | 8.0 |
| TYPE D | USED | 2.0 | 4.5 | 3.36 | 2.64 | 11.7 | 69.7 | 77.6 | 7.9 | 7.6 |
| TYPE D | USED | 3.0 | 3.0 | 3.34 | 2.68 | 11.8 | 69.6 | 77.4 | 7.8 | 7.6 |
| TYPE D | USED | 2.4 | 2.4 | 3.42 | 2.78 | 16.4 | 69.6 | 80.4 | 10.8 | 6.4 |
| TYPE D | USED | 2.2 | 2.2 | 3.46 | 2.84 | 18.7 | 69.6 | 81.6 | 12.0 | 5.9 |

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2008-061860 filed in Japan on Mar. 11, 2008.

BACKGROUND OF THE INVENTION

1. Field of the Invention

The present invention relates to a technology for reducing and stabilizing a beam spot size on a scanning surface in an optical scanning device.

2. Description of the Related Art

Recently, improvement in image quality of images output by "image forming apparatuses, such as multifunction peripherals (MFPs)" through optical scanning is being more and more demanded. To meet such a demand, a beam spot size at the time of optical scanning needs to be reduced and stabilized. "The stabilization of the beam spot size" can be attained by expanding a depth allowance of a light beam (a defocusing distance in an optical axis direction, which is determined such that a beam spot size is maintained within an allowable range). Regarding the depth allowance, it is widely known that the following relationship is satisfied.

$$d \propto w^2/\lambda$$

where d is depth allowance, w is beam spot size, and $\lambda$ is operation wavelength for optical scanning. In other words, if the depth allowance increases, the beam spot size increases in proportion to the depth allowance. Therefore, it has been difficult to attain both reduction and stabilization of the beam spot size at the same time.

One approach to "expand a depth allowance" and maintain a small beam spot size at the same time may be to use a Bessel beam.

A "Bessel beam" is disclosed in, for example, Japanese Patent No. 3507244. Specifically, it is disclosed that the Bessel beam has a side-lobe with an extremely high light intensity and a high-order side-lobe with a relatively high light intensity. Due to such characteristics, if the Bessel beam is used for optical scanning, light use efficiency is lowered, which makes it difficult to increase a processing speed of an image forming operation to the recently-required level.

The inventors of the present invention examined a beam spot image formed by using an optical system of an optical scanning device based on experiments using wave optics. As a result, the inventors found that it is possible to suppress an increase in a beam spot size (widening of a main lobe) even when a focusing position of a beam spot is shifted from a target position on a scanning surface and to expand a depth allowance by performing a "phase adjustment operation" in the following manner. That is, the "phase adjustment operation" is performed for adjusting a phase of a wave front of a light beam incident on the scanning surface so that the peak intensity of a side-lobe (a side-lobe adjacent to a main lobe) in a beam profile of a focusing position of a scanning lens is "slightly increased" to the level that does not degrade the quality of an image to be output.

Meanwhile, "a divergence angle of a laser beam" emitted from a typical semiconductor laser (e.g., an edge-emitting laser and a surface emitting laser) used as a light source of an optical scanning device generally depends on each product. If such a variation is not considered when installing a semiconductor laser as a light source, "effective fluctuation in a numeric aperture (NA) of an optical system in the optical scanning device" occurs, resulting in causing fluctuation in a beam spot size on a scanning surface and increasing the beam spot size.

To prevent the above-mentioned problems, the conventional optical scanning device has been configured to control "a width of a light beam to be incident on a focusing surface" by using an aperture after the light beam is emitted from a semiconductor laser. For example, Japanese Patent No. 2685252 discloses conventional apertures having an elliptical shape and a circular shape.

The inventors found that there is a correlation between the effect of "expansion of a depth allowance by a phase adjustment operation" and the shape of an aperture opening. In other words, to what degree a depth allowance can be expanded by a phase adjustment operation depends on the shape of the aperture opening.

More particularly, the inventors found that an aperture opening having "a rectangular shape", which is a typical shape in the conventional technology, "is not sufficiently effective" for expanding a depth allowance by a phase adjustment operation. This is because side-lobes obtained by using a rectangular aperture opening are localized in the main-scanning direction and in the sub-scanning direction with relatively high peak intensities. Therefore, a beam spot size (a diameter of a light beam including the side-lobes and determined by using $1/e^2$ as a threshold) is deformed.

On the other hand, if an elliptical aperture opening is used, side-lobes are distributed around a main lobe. However, a depth allowance can be expanded by a phase adjustment operation mainly due to side-lobes in the main-scanning direction and in the sub-scanning direction. Therefore, if "the side-lobes are distributed around the main lobe", "side-lobes that are less contributive to expansion of a depth allowance (i.e., side-lobes neither in the main-scanning direction nor in the sub-scanning direction)" occur with relatively high light intensities. As a result, a depth allowance cannot be effectively expanded.

Another conventional aperture having an aperture opening formed into a shape "other than an elliptical shape and a rectangular shape" is disclosed in, for example, Japanese Patent No. 2685252, Japanese Patent Application Laid-open No. 2005-266258, and Japanese Patent Application Laid-open No. 2002-006247. However, a correlation between the shape of the aperture opening and the effect of "the expansion of a depth allowance by a phase adjustment operation" is not disclosed in the above Patent Literatures. In other words, the inventors has newly found that "a depth allowance can be expanded by a phase adjustment operation" and there is a correlation between the shape of the aperture opening and the effect of "the expansion of a depth allowance by the phase adjustment operation", which will be described in detail later.

SUMMARY OF THE INVENTION

It is an object of the present invention to at least partially solve the problems in the conventional technology.

An optical scanning device according to one aspect of the present invention includes a laser light source that emits a light beam; a coupling lens that couples the light beam; an aperture having an aperture opening that transmits a predetermined portion of the light beam; a phase optical element that changes a phase of a portion of the light beam coupled by the coupling lens including a center of the light beam; a deflecting unit that deflects the light beam transmitted through the aperture for scanning; and a scanning lens that focuses the light beam deflected by the deflecting unit into a beam spot on a scanning surface.

"A phase optical element" has a function for increasing the light intensity of a side-lobe of a scanning beam near a scanning surface. The light intensity of the side-lobe of the scanning beam corresponds to "the peak intensity of a side-lobe adjacent to a main lobe".

The phase optical element is an optical element that performs the above-mentioned "phase adjustment operation", and has "a phase distribution" for adjusting a phase of a light beam. That is, a phase of a wave front of a coupled light beam is adjusted by the phase distribution when the light beam passes through the phase optical element.

"An aperture" has an aperture opening that satisfies the following Inequality $$0.03 \leq (SR-SA)/SR \leq 0.20$$

where SR is area of a rectangle circumscribing the aperture opening and SA is area of the aperture opening.

Due to the function of the phase optical element and a light shielding function of the aperture, a depth allowance of a beam spot can be expanded.

The aperture and the phase optical element are arranged on an optical path from a coupling lens to a deflecting unit. The order of placement of the aperture and the phase optical element can be arbitrary, that is, whichever can be placed on the side of a light source. It is applicable to arrange the aperture and the phase optical element separately from each other. However, to make an adjustment of a positional relation between the aperture and the phase optical element easy, it is preferable to arrange them closer to each other or even to integrate with each other.

The optical scanning device can be configured to couple a light beam by a coupling lens, perform beam shaping by using an aperture, perform a phase adjustment operation on the light beam by using a phase optical element, and deflect the light beam by a deflecting unit. If a polygon mirror is used as the deflecting unit, it is preferable to employ a linear-image imaging optical system such as a cylindrical lens that converges a light beam incident on the deflecting unit in the sub-scanning direction and focuses the light beam into a linear image elongated in a main-scanning direction near a deflecting reflection surface so that an optical face tangle error can be corrected. The scanning lens of this case is "an anamorphic optical system that has high positive power in the sub-scanning direction".

The aperture is formed such that at least a portion of the aperture opening is included between the rectangle and an inscribed ellipse.

The shape of the aperture opening is edges of the aperture opening. The shape of the aperture opening includes a combination of at least two of a group of a circular arc, an elliptical arc, and a straight line. The aperture opening has a contour formed of one of the following combination shapes: "a circular arc and an elliptical arc"; "an elliptical arc and a line"; and "a circular arc, an elliptical arc, and a line". It is also possible to form the aperture opening by combining circular arcs having different curvature radiuses, or elliptical arcs having different eccentricities.

Furthermore, the shape of the aperture opening can be an octagon. In this case, however, the aperture opening is formed of eight lines.

The shape of at least a portion of the aperture opening is represented by $$z = b(1-(y/a)^{nz})^{(1/ny)}$$

where y is coordinate of a main-scanning direction, z is coordinate of a sub-scanning direction, 2b is diameter of the aperture opening in the sub-scanning direction, 2a is diameter of the aperture opening in the main-scanning direction, and nz and ny are positive integers.

In the aperture opening, either one of an aperture opening edge in the main-scanning direction and an aperture opening edge in the sub-scanning direction whichever having a larger light intensity has a smaller curvature of the circular arc or the elliptical arc.

In an octagon shape of the aperture opening,
if PAm>PAs, Bm>Bs, and
if PAs>PAm, Bs>Bm, where PAm is light intensity of an aperture opening edge in a main-scanning direction, PAs is light intensity of an aperture opening edge in a sub-scanning direction, Bm is ratio of length of a line of the aperture opening parallel to the main-scanning direction to length of an edge of a rectangle circumscribing the aperture opening in the main-scanning direction, Bs is ratio of length of a line of the aperture opening parallel to the sub-scanning direction to length of an edge of the rectangle circumscribing the aperture opening in the sub-scanning direction.

In the aperture opening,
if PAm>PAs, ny>nz, and
if PAs>PAm, nz>ny, where PAm is light intensity of an aperture opening edge in the main-scanning direction and PAs is light intensity of an aperture opening edge in the sub-scanning direction.

The laser light source is formed of an edge-emitting laser, and the aperture opening is formed such that PAm>PAs is satisfied, where PAm is light intensity of an aperture opening edge in the main-scanning direction, PAs is light intensity of an aperture opening edge in the sub-scanning direction.

The laser light source is formed of an edge-emitting laser array, and the aperture opening is formed such that PAs>PAm is satisfied, where PAm is light intensity of an aperture opening edge in the main-scanning direction, PAs is light intensity of an aperture opening edge in the sub-scanning direction.

The laser light source is formed of either one of a surface-emitting laser and a surface-emitting laser array, and the aperture opening is formed such that PAs>PAm is satisfied, where PAm is light intensity of an aperture opening edge in the main-scanning direction, PAs is light intensity of an aperture opening edge in the sub-scanning direction.

With the above configurations, it is possible to "effectively expand a depth allowance without imposing restrictions on optical layouts nor reducing the light intensity of a light beam transmitting the aperture opening even when a ratio of a width in the main-scanning direction (hereinafter, "a main-scanning width") to a width in a sub-scanning direction (hereinafter, "a sub-scanning width") of a light beam incident on an aperture is different from a ratio of a main-scanning width to a sub-scanning width of an aperture opening of the aperture.

The scanning lens is formed of a single lens. The scanning lens can be formed of two or more lenses, or combination of one or more lenses and one or more focusing mirrors. However, if the scanning lens is formed of a single lens, it is possible to "reduce a size and costs of the optical scanning device".

An image forming apparatus according to another aspect of the present invention forms an electrostatic latent image on a photosensitive element. The image forming apparatus includes an optical scanning device according to the present invention.

The photosensitive element includes a plurality of photosensitive elements on which electrostatic latent images of different colors are formed and developed into toner images with toners of corresponding colors, respectively, and the toner images are superimposed on a recording medium to form a full-color image.

The optical scanning device used in the image forming apparatus can be configured to employ "a single-beam scanning system" that performs optical scanning using an edge-emitting laser or a surface emitting laser. Further more, the optical scanning device can be configured to employ "a multi-beam scanning system" that performs optical scanning using an edge-emitting laser array or a surface emitting laser array.

The image forming apparatus can be formed as a known tandem color image forming apparatus.

The image forming apparatus of the present invention includes the optical scanning device in which a beam spot size for optical scanning is downsized and made stable. Therefore, it is possible to perform image forming with good image quality. Furthermore, because the beam spot size is made stable, it is possible to "reduce frequency of process control". Therefore, environmental loads such as toner consumption can be reduced.

Before giving detailed description of present embodiments, a phase adjustment operation by a phase optical element and an expansion of a depth allowance by the phase adjustment operation are described below.

The phase adjustment operation by "the phase optical element" is performed to increase the light intensity of a side-lobe of a scanning beam near a scanning surface. In this case, the light intensity of the side-lobe of the scanning beam is raised to "the level that does not affect optical scanning". Therefore, the phase optical element is designed to have a phase distribution that "increases the light intensity of the side-lobe to the level that does not affect optical scanning".

That is, the peak intensity of a side-lobe (the side-lobe adjacent to a main lobe) in a beam profile of a beam spot on a focusing surface, that is, on a scanning surface, of the scanning lens is "raised not to exceed the level that affects the optical scanning". According to the present invention, the phase distribution of each of the area A and surrounding areas of the area A is determined so that "the peak intensity of the side-lobe is raised not to exceed the level that affects the optical scanning".

Specifically, the phase distribution of the area A is determined so that the following Inequality is satisfied.

$$PS/PM > PS1/PM1 \tag{A1}$$

where PS is peak intensity of a side-lobe and PM is peak intensity of a main lobe in a light-intensity profile (a beam profile) of a beam spot on a focusing surface (a scanning surface in design) of a scanning lens when the phase adjustment is performed by using the phase optical element, and PS1 is peak intensity of a side-lobe and PM1 is peak intensity of a main lobe in a light-intensity profile of a beam spot on the focusing surface when the phase adjustment is not performed by using the phase optical element. Hereinafter, the above-mentioned setting of the phase distribution is referred to as "a phase adjustment".

Furthermore, it is preferable to set the phase distribution of the area A so that the following Inequality is satisfied.

$$PS2/PM2 < PSA/PMA \tag{A2}$$

where PS2 is peak intensity of a side-lobe and PM2 is peak intensity of a main lobe in a light-intensity profile of a beam spot "at a position on the optical axis other than the focusing surface" of the scanning lens when the phase adjustment is performed by using the area A, and PSA is peak intensity of a side-lobe and PMA is peak intensity PMA of a main lobe in a light-intensity profile of a beam spot at the same position when the phase adjustment is not performed by using the area A.

Moreover, it is preferable to set the phase distribution of the area A so that the following Inequality is satisfied.

$$PM4/PM3 > PM6/PM5 \tag{A3}$$

where PM4 is peak intensity of a main lobe in "a light-intensity profile of a beam spot at the position other than the focusing surface" and PM3 is peak intensity of a main lobe in "a light-intensity profile of a beam spot on the focusing surface" when the phase adjustment is performed based on Inequalities (A1) and (A2), and PM6 is peak intensity of a main lobe in "a light-intensity profile of a beam spot at the position other than the focusing surface" and PM5 is peak intensity of a main lobe in "a light-intensity profile of a beam spot on the focusing surface" when the phase adjustment is not performed based on Inequalities (A1) and (A2).

Generally, the peak intensity of the light-intensity profile of the beam spot at "a position distant from the focusing surface" is smaller than the peak intensity of the beam spot on the focusing surface. If Inequality (A3) is satisfied, which means that the reduction level of the peak intensity at the position distant from the focusing surface is suppressed, it is possible to suppress the reduction amount of light energy used for exposing a photosensitive element in an image forming apparatus even when "a position of the scanning surface changes due to change in setting position of the photosensitive element" over time. Therefore, "fluctuation in size of writing dot" caused by fluctuation in exposure light energy can be suppressed, resulting in improving image quality of output images.

Inequality (A1) is a necessary condition that must be satisfied for expanding a depth, that is, for "expanding a depth allowance". Therefore, the phase distribution of the phase optical element is set so that Inequality (A1) is satisfied.

The greater an increase in peak intensity of the side-lobe is, the greater the "expansion of the depth allowance" is. However, if the peak intensity of the side-lobe is raised too high, "toner scattering" occurs around dots constituting an image to be formed or "background fog" of an image occurs. Besides, if the peak intensity of the main lobe is reduced too low, a processing speed of optical scanning may be delayed.

Therefore, it is preferable to set the peak intensity of the side-lobe to be "13.5% or less, more preferably, 10% or less of the peak intensity of the main lobe".

FIGS. 4A to 4D are examples of phase optical elements according to the embodiment.

The top figure of FIG. 4A depicts a phase optical element viewed from a direction in which a light beam is transmitted. The bottom figure of FIG. 4A depicts a cross section of the phase optical element cut along a dashed line of the top figure. Colored portions in the top figure of FIG. 4A correspond to portions "having a depth different from white-colored portions". "The colored portions" form "a phase distribution". The phase optical element of FIG. 4A is formed of a plate material having a uniform refractive index, and the depth of the colored portions is set to be different from that of the white-colored portions. The depth of the white-colored portions is set to be uniform. Therefore, a wave front of a light beam that transmits the white-colored portions does not change.

On the other hand, "the colored portions" that form the phase distribution is set to form "a distribution with a height h' from the surface of the white-colored portions". The height h' is set so that "a phase difference is determined to be a value other than 2π (rad)" with respect to an operation wavelength λ. If the phase distribution is given by "two stages of height zero and height h'" as shown in FIGS. 4A to 4D, the height h' should preferably be set so that the phase difference is determined to be a value around π (rad).

A phase difference ( ) (rad) is obtained by the following Equation:

$$( )=2\pi(n-1)h'/\lambda$$

where h' represents height of the area A, λ represents operation wavelength, and n represents refractive index of the material.

In other words, if a plane wave is incident on the phase optical element of FIG. 4A, delay in the phase ("the phase difference" in the above description) occurs on a wave front of the transmitted light in accordance with the above-mentioned "phase distribution". The above situation is a result of the phase adjustment operation by the phase optical element. Thus, designing the phase distribution of the phase optical element so that the light intensity of the side-lobe of the scanning beam near the scanning surface is raised "to the level that does not affect the optical scanning" is resulted from designing the phase distribution so that the above-mentioned object can be attained. FIGS. 4B to 4D are other examples of the phase optical element according to the embodiment. In each case, a phase distribution is formed such that "colored portions are shaped to be a pattern having a height h' higher" than the surface of white-colored portions.

In the example shown in FIGS. 4A to 4D, phase distributions are formed based on distributions of the heights h' from the surface of the white-colored portions. However, the heights can be set in three or more stages or can be set to change continuously. With such a configuration, the phase distribution can be more flexibly designed, which is preferable. Furthermore, a preferable shape of the beam profile of a beam spot formed on the focusing surface is "a shape symmetric with respect to the main-scanning direction and to the sub-scanning direction". Therefore, a phase distribution pattern of the phase optical element is preferably set to be a pattern having "a height distribution that is axisymmetric" with respect to a straight line passing through the center of "a phase distribution pattern and being parallel to the main-scanning direction and axisymmetric with respect to a straight line passing through the center and being parallel to the sub-scanning direction", as shown in FIGS. 4A to 4D.

The phase distribution patterns shown in FIGS. 4A and 4B are examples of "a phase distribution of two-dimensionally flexible design" using a pixel structure. Concretely, FIG. 4A depicts an example of a phase distribution pattern in which "symmetry with respect to the main-scanning direction does not coincide with that to the sub-scanning direction". FIG. 4B depicts an example of a phase distribution pattern in which "symmetry with respect to the main-scanning direction coincides with that to the sub-scanning direction".

FIG. 4C depicts a phase distribution formed into an elliptical ring shape. FIG. 4D depicts a phase distribution formed into "a structure obtained by combining portions of an elliptical ring shape (or a circular ring shape) with each other". The phase distributions of FIGS. 4C and 4D correspond to phase distribution patterns. The phase distribution patterns are not limited to the examples shown in FIGS. 4A to 4D.

If an optical scanning device employs a polygon mirror as a deflecting unit to correct an optical face tangle error, the scanning lens is set to be an anamorphic lens and has lateral magnifications in the main-scanning direction and in the sub-scanning direction that are different from each other. Therefore, it is preferable to employ "a pattern that does not have rotational symmetry through 90 degrees" as shown in FIGS. 4A, 4C, and 4D. That is, it is preferable to set a phase distribution as shown in FIGS. 4A, 4C, and 4D such that a height distribution that has an axisymmetric shape in the main-scanning direction and in the sub-scanning direction and does not have rotational symmetry through 90 degrees.

While "the pattern whose portions are set to have a height different from the other portions are formed on a plate material having a uniform refractive index such as a glass plate and a resin plate" is described above, the phase distribution can be formed in different ways. For example, a phase distribution pattern can be formed by forming "an area having a diffractive index different from that of the colored portions" in accordance with a pattern of the colored portions. However, considering "easiness of formation", it is preferable to form a phase distribution by using "the height distribution" as described above.

"Expansion of a depth allowance by the phase optical element" is described below.

Simulation results obtained when the phase optical element is designed to have the above-described phase distribution are described below. The phase optical element that is capable of expanding the depth allowance is also referred to as "a depth expanding element" hereinafter.

A "simulation model" as shown in FIG. 5 is employed to make the explanation be general.

In FIG. 5, reference numeral 121 denotes an aperture, reference numeral 122 denotes "a depth expanding element", reference symbol L denotes a lens, and reference symbol IS denotes a focusing surface.

The depth expanding element 122 is "a virtual optical element provided for simulation".

An incident light beam is of "a plane wave having uniform intensity", and is shaped through the aperture 121. The depth expanding element 122 is attached closely (zero distance) to the aperture 121, and performs a phase adjustment operation to the light beam due to the act of a phase distribution of the depth expanding element 122. The lens L is an aplanatic lens having a focal length indicated by f of FIG. 5, and causes the light beam to be focused into a beam spot at the position of an optical axis of the focusing surface IS.

The aperture 121 and the depth expanding element 122 are arranged at the position of a front focal plane of the lens L. The following parameters are used in the simulation.

The shape of the opening of the aperture 121: circle
The diameter of the opening of the aperture 121: 930 micrometers
The focal length f of the lens L: 50 millimeters In the simulation model, an incident light beam is assumed as a plane wave having uniform intensity. Meanwhile, the intensity distribution of a semiconductor laser beam used as a light source in the optical scanning device is usually the Gaussian distribution. However, a result of the simulation is effective even when the light beam is the Gaussian beam. This is because a method for expanding the depth allowance in the embodiment is "a method of controlling a beam profile on a focusing surface by controlling a phase distribution only".

The lens L is assumed to be "a single lens in a simplified form" modified from a focusing lens system arranged on the side of an image than the aperture and the phase optical element. While the optical system configuration in the simulation is different from that used in the actual optical scanning device, the qualitatively same effect as described below can be attained even in the actual optical scanning device. However, if at least one anamorphic lens is arranged between a light source and the scanning surface, because focusing magnification rates in the main-scanning direction and in the sub-scanning direction are different from each other, it is necessary to proportionally enlarge or reduce the aperture and the depth expanding element in the main-scanning direction or in the sub-scanning direction depending on a difference between the magnification rates in the main-scanning direction and in the sub-scanning direction.

Under the above-mentioned conditions, "the wave-optical simulation" is performed.

An example in a case of not using the depth expanding element 122 in the simulation model of FIG. 5 is described below. FIG. 6A depicts a simulation result of "a beam profile at the position of the focusing surface" when the depth expanding element 122 is not used. The peak intensity is normalized to one. Under these conditions, the peak intensity of a side-lobe is 0.016 (1.6% of the peak intensity).

FIG. 6B depicts "a depth curve with beam spot size (micrometers) on the vertical axis and defocusing (millimeters) (a distance shifted from a focal point of the lens) on the horizontal axis". The beam spot size corresponds to the diameter of a portion that takes a value of "$1/e^2$" with respect to the peak intensity. If the depth allowance is calculated on the assumption that "the allowable range of the beam spot size is within 105% of the minimum beam spot size", the depth allowance becomes 8.9 millimeters in the simulation of FIG. 6B.

Simulation results in a case of using five different depth expanding elements (five different phase distribution patterns of the phase optical element) are described below with reference to FIGS. 7A to 7C, 8A to 8C, 9A to 9C, 10A to 10C, and 11A to 11C. Each of FIGS. 7A, 8A, 9A, 10A, and 11A depicts "a phase distribution pattern of the depth expanding element". Each of FIGS. 7B, 8B, 9B, 10B, and 11B depicts "a beam profile at the position on the focusing surface". Each of FIGS. 7C, 8C, 9C, 10C, and 11C depicts "a depth curve" with beam spot size on the vertical axis and defocusing on the horizontal axis. In the "beam profile", "the peak intensity is normalized to one".

In each of the depth expanding elements shown in FIGS. 7A, 8A, 9A, 10A, and 11A, the phase distribution of the phase expanding element corresponds to "colored portions". The phase difference between "the colored portions" and "white-colored portions" is determined to be "$\pi$" from Equation ( )=$2\pi(n-1)h'/\lambda$, where h' is height of the colored portion. That is, "the white-colored portion corresponds to zero while the darkly-colored portion corresponds to $\pi$".

"The depth expanding elements" shown in FIGS. 7A, 8A, 9A, 10A, and 11A are referred to as depth expanding elements 1 to 5, respectively.

Each of the depth expanding elements 1 to 5 has "a phase distribution pattern of a circular hollow ring" with "an outer diameter and an inner diameter indicated in the respective figures". The center of the circular phase distribution pattern coincides with "the center of the aperture 121".

As shown in FIGS. 7B, 8B, 9B, 10B, and 11B, even when the depth expanding elements 1 to 5 are used, the peak intensity of a high-order side-lobe is sufficiently low (a high-order beam with the high light intensity is not generated on the periphery of the graph shown in each of FIGS. 7B, 8B, 9B, 10B, and 11B), while the light intensity of the main lobe is retained at the high level. Compared with the beam profile shown in FIG. 6A in which the depth expanding element is not used, "the peaks of side-lobe lights adjacent to main lobe lights in the beam profiles are increasing" by using the depth expanding elements 1 to 5.

Furthermore, as can be found from the "depth curve" shown in each of FIGS. 7C, 8C, 9C, 10C, and 11C, fluctuation in a beam spot size due to defocusing decreases by using the depth expanding elements 1 to 5, resulting in expanding the depth allowance.

An example in a case of using a phase optical element with a structural pattern that does not have a depth expanding function is described below.

A "phase distribution pattern" shown in FIG. 12A is, similar to those of the depth expanding elements 1 to 5, "a phase distribution pattern in a circular hollow ring shape having a phase difference of $\pi$" with "an outer diameter and an inner diameter" indicated in FIG. 12. The center of the circular phase distribution pattern coincides with "the center of the aperture".

However, as shown in the beam profile of FIG. 12B, the peak of a side-lobe light adjacent to a main lobe lights is low. Besides, as can be found from FIG. 12C, no function for expanding the depth allowance is obtained.

FIG. 13 is a table containing a side-lobe peak intensity, a depth allowance, and a beam spot size, in an associated manner with respect to each side-lobe of each of the depth expanding elements 1 to 5.

The peak intensity is normalized to one in "the beam profile". The depth allowance is calculated based on assumption that "the allowable range of the beam spot size is within 105% of the minimum beam spot size". In FIG. 13, "without depth expanding element" corresponds to the example shown in FIGS. 6A and 6B, and "conventional depth expanding element" corresponds to the "element with a phase distribution pattern that does not have a depth expanding function" shown in FIGS. 12A to 12C.

It can be found from FIG. 13 that "the depth allowance is expanded by using the depth expanding elements 1 to 5 that increase the peak intensities of side-lobes, and as the peak intensities of the side-lobes increase, the expansion rate of the depth allowance increases".

It can also be found from FIG. 13 that the depth allowance is shrunk when "the phase optical element with a structural patter that does not have a phase expanding function" is used.

As described above, a use of the depth expanding elements 1 to 5 expands the depth allowance of a beam spot size near the position of the focal point of a lens. Therefore, it is not necessary to add a lens to a relay optical system and the like, which is advantageous for system layout. Further, high light use efficiency can be achieved.

FIG. 14 is a graph whose horizontal axis represents defocusing (millimeters) and vertical axis represents side-lobe peak intensity (when main lobe peak intensity is a normalized value of one) in "a case of not using the depth expanding element" and "a case of using the depth expanding elements 1 to 5". When the phase distribution pattern of FIG. 12A is used, the distortion of a beam profile at a position other than the focal position is severe, where a side-lobe light and a main lobe light overlap each other, making it impossible to distinguish the peak intensity of the side-lobe light from main lobe light. Therefore, a case of use of the phase distribution pattern of FIG. 12A is not shown in the graph.

Referring to FIG. 14, at the focal position (the focusing surface position where defocusing is 0 millimeter), the side-lobe peak intensity in the case of not using the depth expanding element is the smallest. However, in an area where defocusing is larger than 5 millimeters to 6 millimeters, the side-lobe peak intensity is smaller when any one of the depth expanding elements 1 to 5 is used.

While the phase distribution pattern in the shape of "a hollow circle (ring)" is described as an example of a phase distribution pattern of phase optical element, the shape of the phase distribution pattern is not limited to this example. As described above, various patterns similar to the ring-band structure can be applicable, such as circular patterns, elliptical patterns, and elliptical ring-shape patterns.

Furthermore, the aperture opening having "a circular shape" is used in the above-described simulation. However, in the following description, "the shape that can effectively expand a depth allowance" will be described.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram of an image forming apparatus according to the embodiment;

FIGS. 4A to 4D are examples of phase patterns of a phase optical element according to the embodiment;

FIG. 21 is a schematic diagram for explaining a phase optical element used for simulations;

FIGS. 22A to 22F are schematic diagrams representing relationships between a shape of an aperture opening and a beam profile obtained by simulations according to the embodiment;

FIG. 23 is a table containing data obtained by a simulation using the aperture shown in FIGS. 22A and 22B;

FIG. 24 is a table containing data obtained by a simulation using the aperture opening of type A;

FIG. 25 is a table containing data obtained by a simulation using the aperture opening of type B;

FIG. 26 is a table containing data obtained by a simulation using the aperture opening of type C;

FIG. 27 is a table containing data obtained by a simulation using the aperture opening of type D.

DETAILED DESCRIPTION OF THE PREFERRED EMBODIMENTS

Exemplary embodiments of the present invention are explained in detail below with reference to the accompanying drawings.

Figure 1:
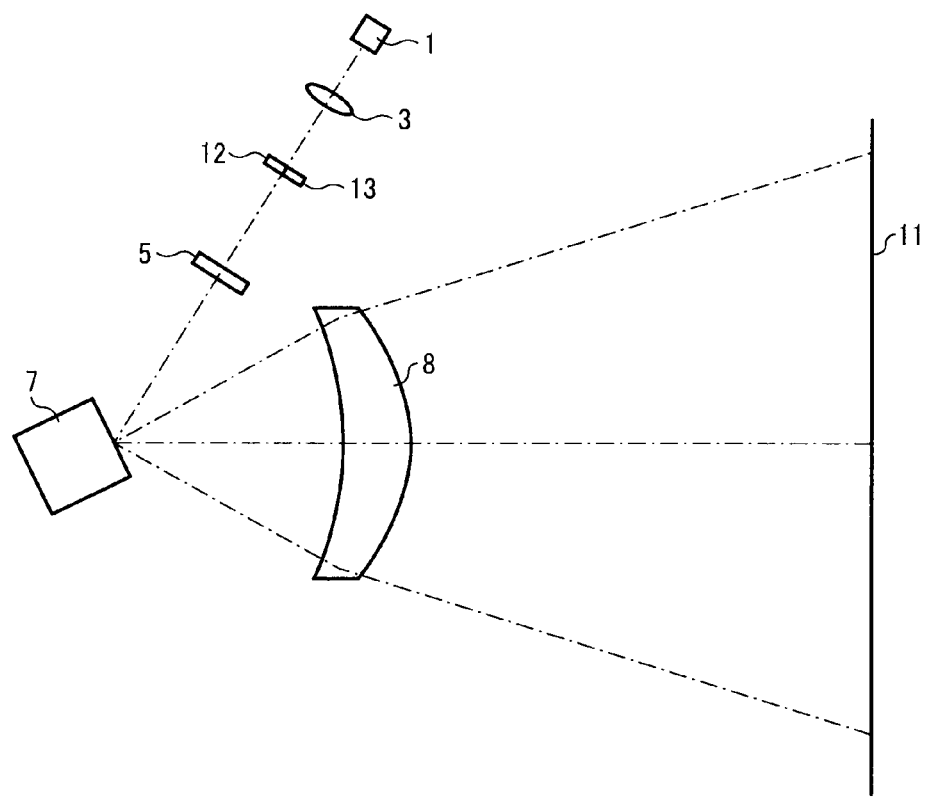
FIG. 1 is a schematic diagram of optical arrangement of an optical scanning device according to an embodiment of the present invention.

FIG. 1 is a schematic diagram of optical arrangement of an optical scanning device according to an embodiment of the present invention.

In FIG. 1, an optical system that forms an optical path from a laser light source 1 to a scanning surface 11 is arranged in a plane.

A light beam emitted from the laser light source 1 is converted into a weak divergent beam by a coupling lens 3, and falls on a cylindrical lens 5 through an aperture 12 and a phase optical element 13 that is arranged close to an output surface of the aperture 12. The light beam is converged by the cylindrical lens 5 in a sub-scanning direction (a direction perpendicular to the plane of FIG. 1), and focused into "a linear image elongated in a main-scanning direction" near a deflecting reflection surface of a polygon mirror 7, which serves as a deflecting unit. It is assumed, in the embodiment, that the polygon mirror 7 has four deflecting reflection surfaces.

The light beam deflected by the deflecting reflection surface of the polygon mirror 7 passes through a scanning lens 8 and is focused into a beam spot on the scanning surface 11. The scanning lens 8 can be made of glass or resin. The phase optical element 13 "adjusts a phase of a transmitted light beam based on a phase distribution".

The scanning lens 8 has a function same as that of an f( ) lens. That is, the scanning lens 8 converts a constant angular-velocity scanning of the light beam deflected by the polygon mirror 7 into a constant velocity scanning with the beam spot on the scanning surface 11.

Due to the scanning lens 8, the position of the deflecting reflection surface of the polygon mirror 7 and the position of the scanning surface 11 are in "a conjugate relation with respect to the sub-scanning direction". In the sub-scanning direction, "the linear image elongated in the main-scanning direction" is an object point of the scanning lens 8, so that "optical face tangle error" of the polygon mirror 7 is corrected. In the embodiment, it is assumed that the scanning lens 8 is made of resin. It is applicable to form one or more "diffraction grating surfaces" on one or more optical surfaces to correct fluctuation in a focusing function of the optical system caused by fluctuation in temperature or environmental fluctuation.

The polygon mirror 7 is housed in an insulating casing (not shown in FIG. 1) having a window covered by a parallel plate glass, through which a light beam emitted from the laser light source 1 enters into the polygon mirror 7 and a deflected light beam is output from the polygon mirror 7 towards the scanning lens 8.

The scanning surface 11 in FIG. 1 is, in concrete terms, "the photosensitive surface of a photosensitive element". The optical arrangement of the optical scanning device shown in FIG. 1 is a widely known configuration. By combining the optical scanning devices having the configuration of FIG. 1 in an arrangement shown in FIG. 2, a tandem optical scanning device can be obtained.

Figure 2:
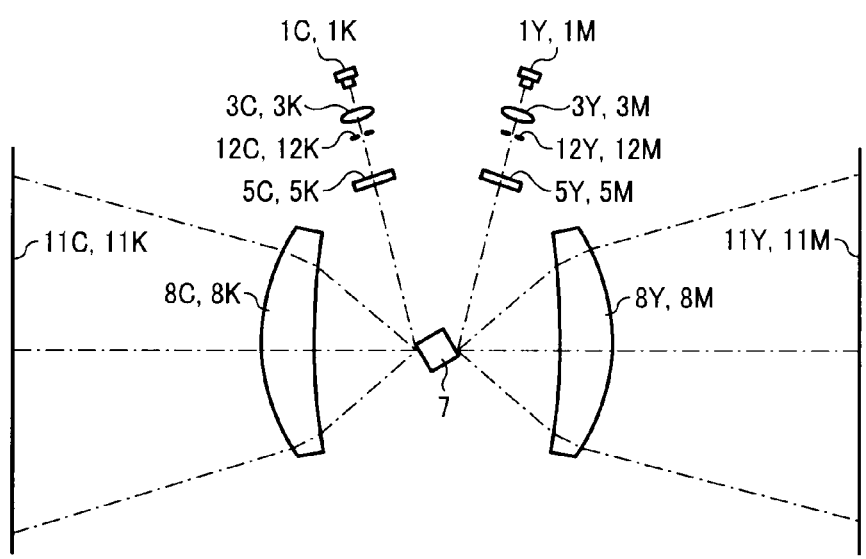
FIG. 2 is a schematic diagram of an optical system of a tandem optical scanning device according to the embodiment.
Figure 5:
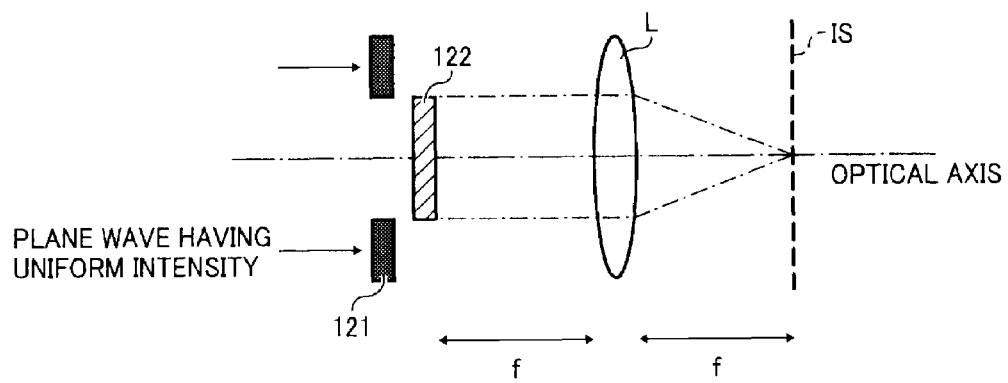
FIG. 5 is a schematic diagram of an optical system used for a simulation of expanding a depth allowance according to the embodiment.
Figure 6A:
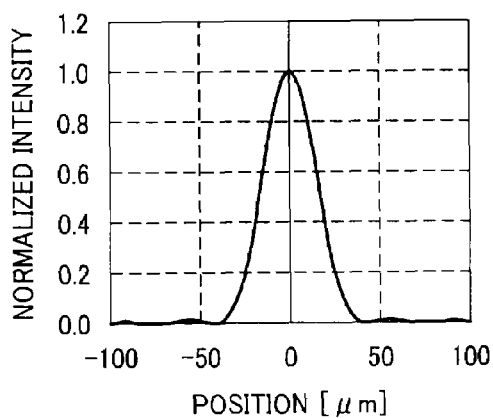
FIG. 6A is a graph of a beam profile when the phase optical element is not used.
Figure 6B:
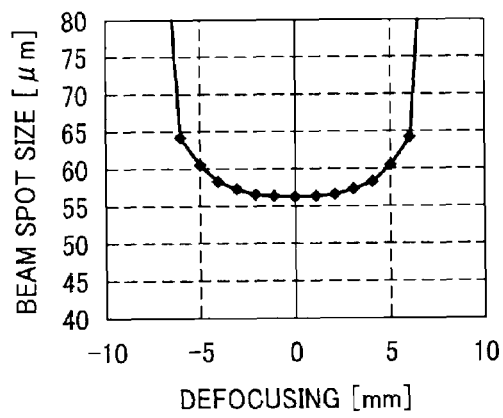
FIG. 6B is a graph of a depth curve when the phase optical element is not used.
Figure 7A:
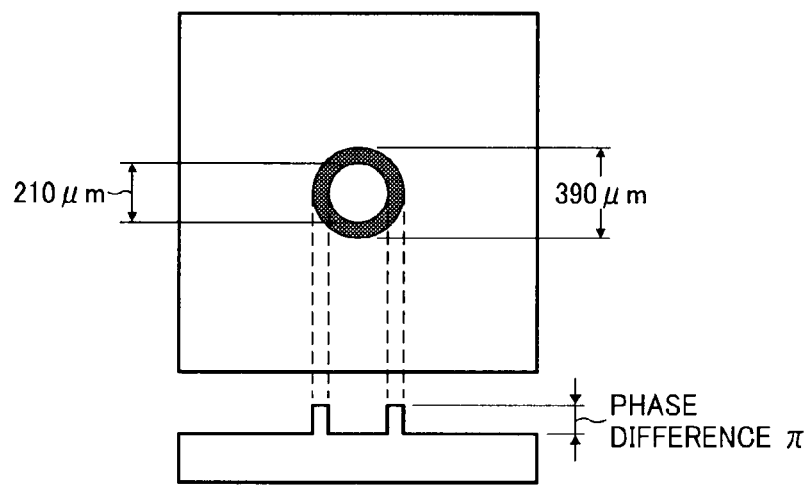
FIGS. 7A to 7C are schematic diagrams for explaining an example of a phase pattern.
Figure 7B:
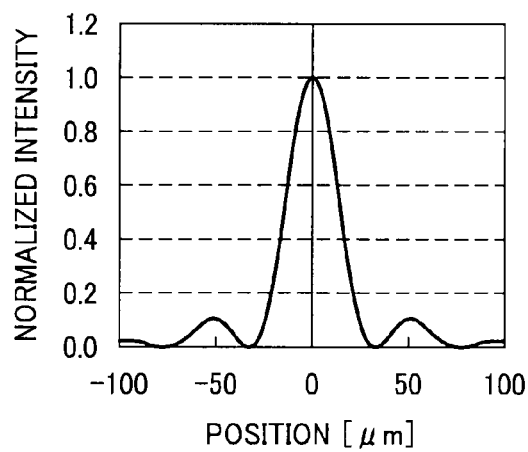
Figure 7C:
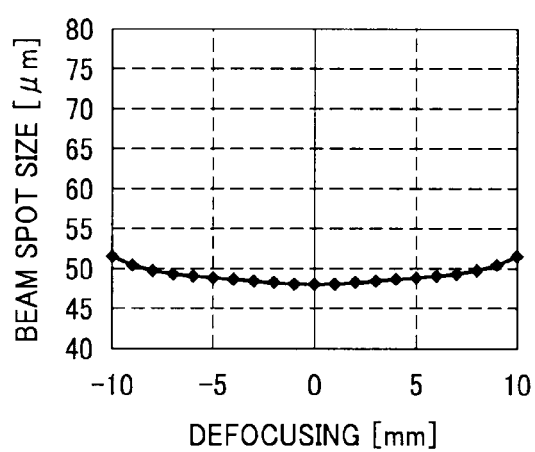
Figure 8A:
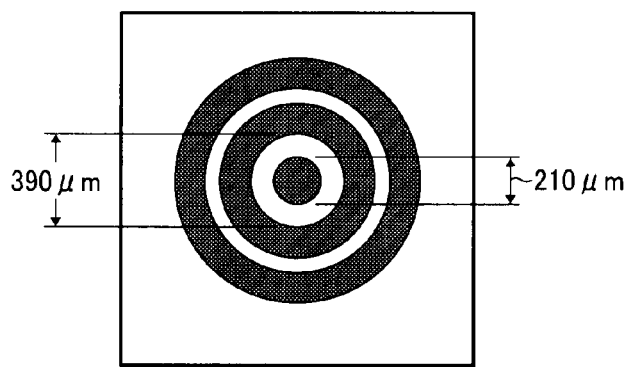
FIGS. 8A to 8C are schematic diagrams for explaining another example of the phase pattern.
Figure 8B:
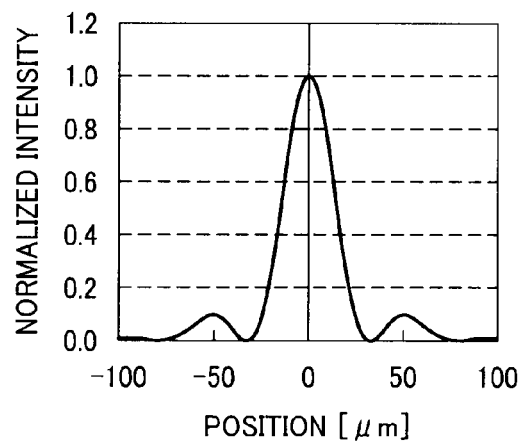
Figure 8C:
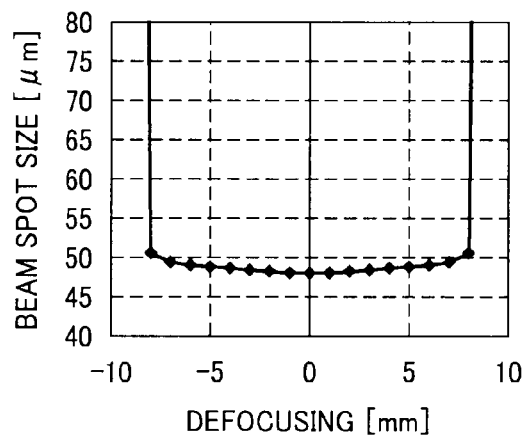
Figure 9A:
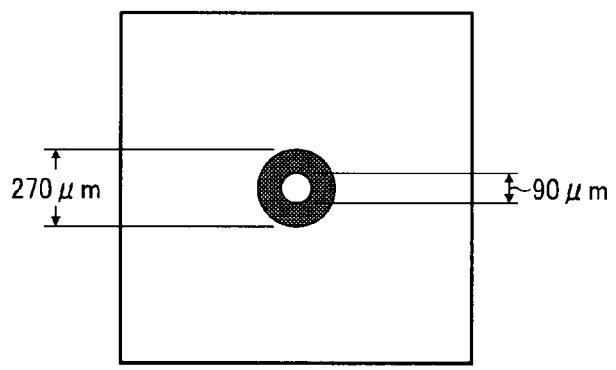
FIGS. 9A to 9C are schematic diagrams for explaining still another example of the phase pattern.
Figure 9B:
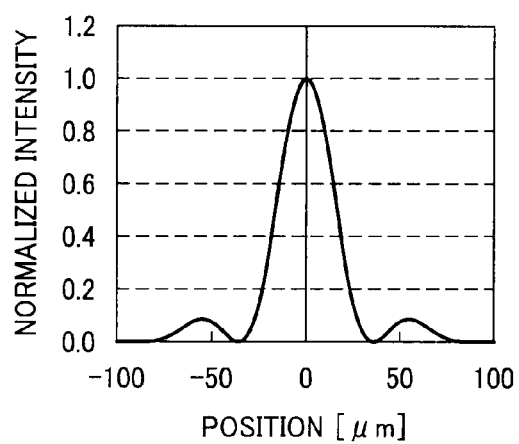
Figure 9C:
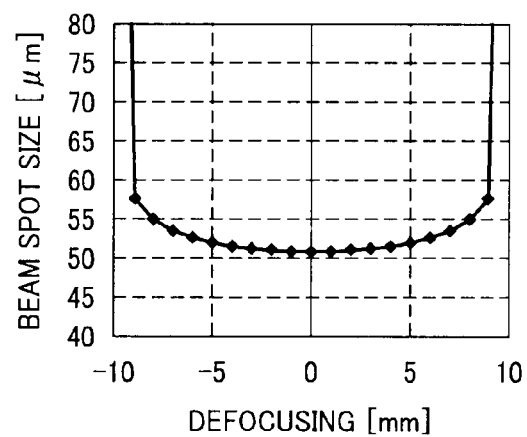
Figure 10A:
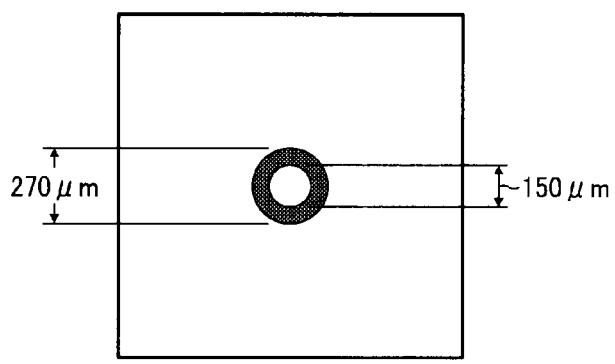
FIGS. 10A to 10C are schematic diagrams for explaining still another example of the phase pattern.
Figure 10B:
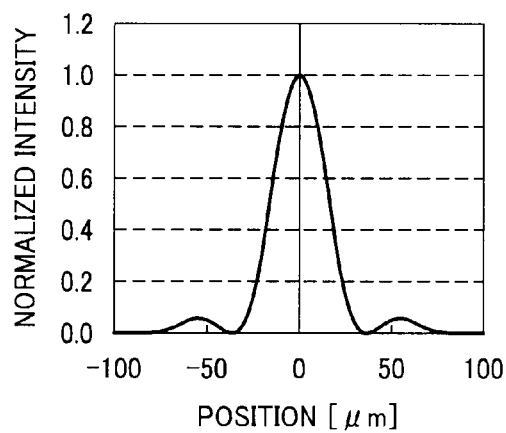
Figure 10C:
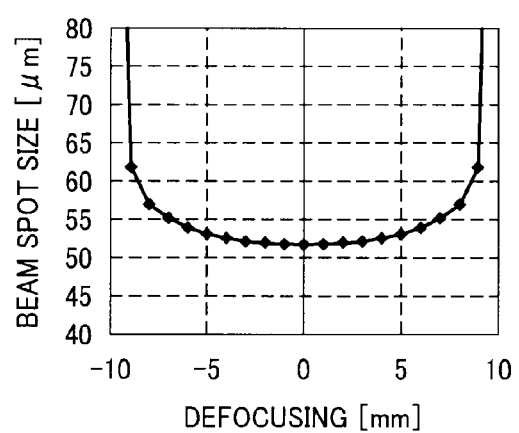
Figure 11A:
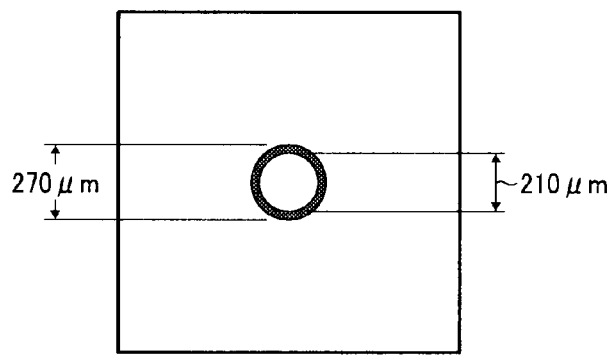
FIGS. 11A to 11C are schematic diagrams for explaining still another example of the phase pattern.
Figure 11B:
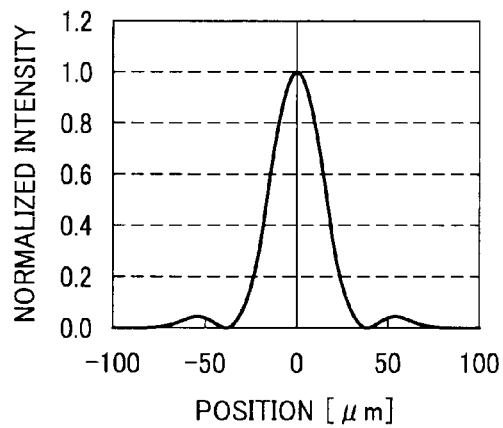
Figure 11C:
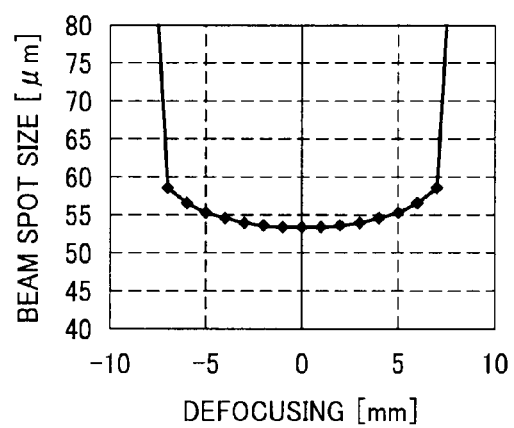
Figure 12A:
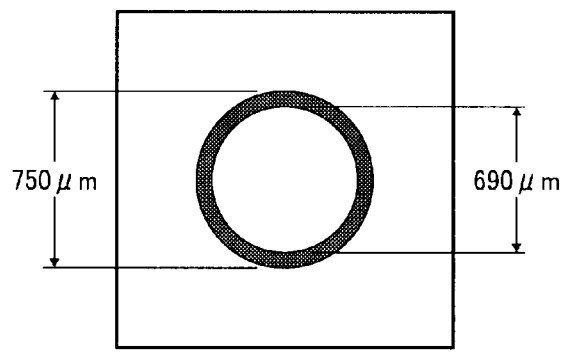
FIGS. 12A to 12C are schematic diagrams for explaining an example of a phase pattern that does not have a function for expanding a depth allowance.
Figure 12B:
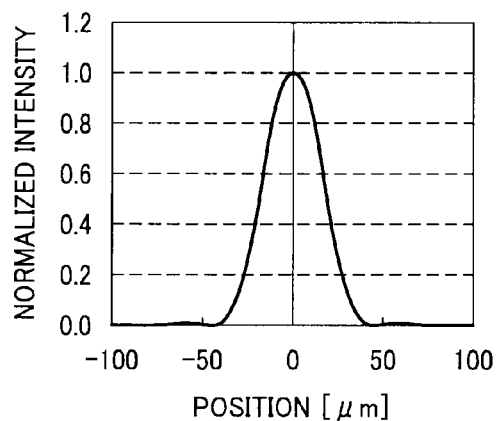
Figure 12C:
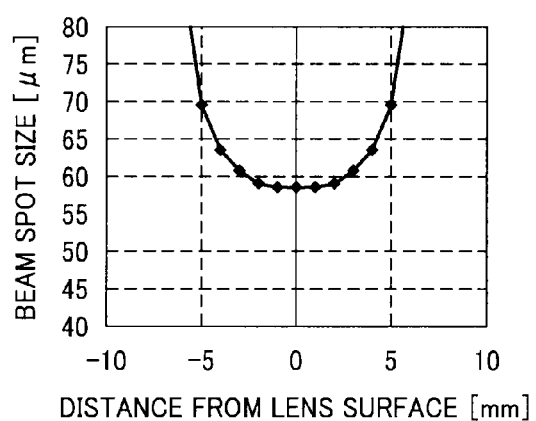
Figures 13, 14:
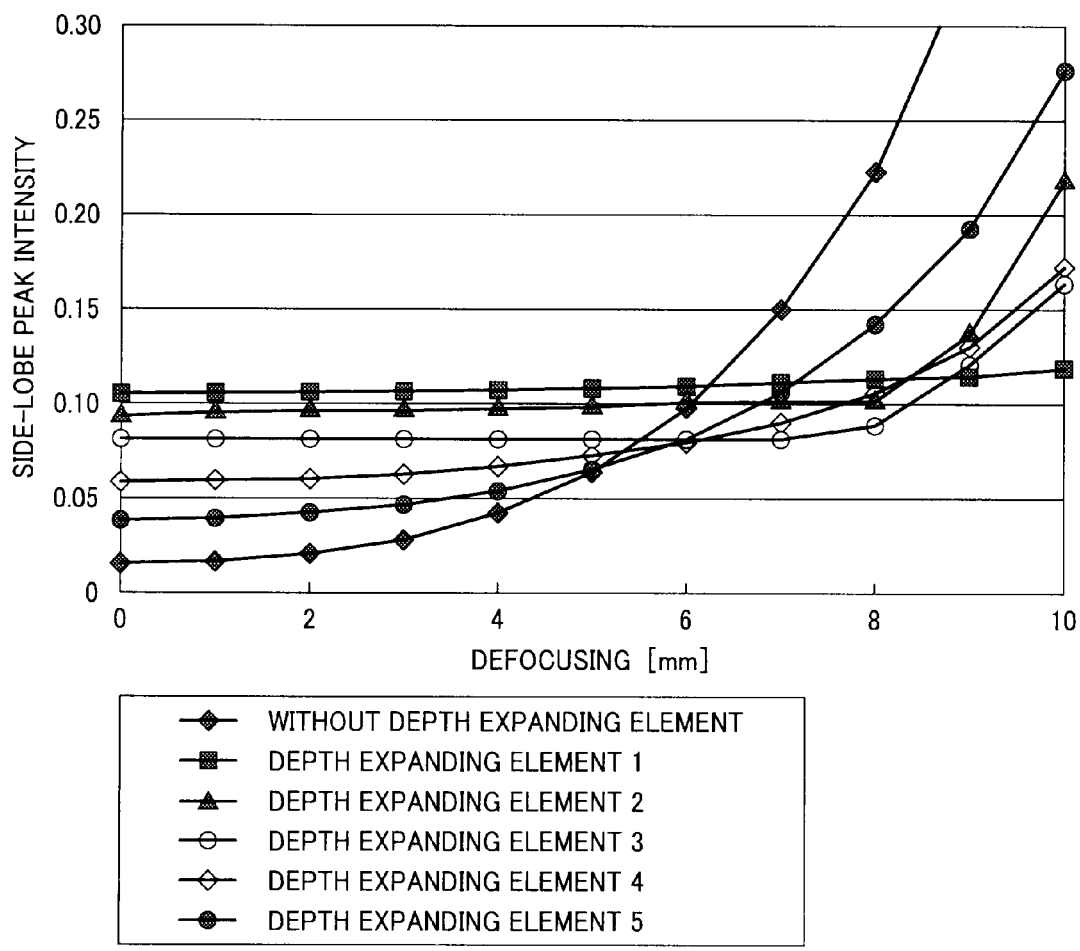
FIG. 13 is a table containing a side-lobe peak intensity, a depth allowance, and a beam spot size according to the embodiment.
FIG. 14 is a graph of defocusing versus side-lobe peak intensity in situations when a depth allowance is expanded by using the phase optical element and when a depth allowance is not expanded by using the phase optical element.

FIG. 2 is a schematic diagram of an optical system of the tandem optical scanning device viewed in the sub-scanning direction, i.e., the direction in which a rotating shaft of the polygon mirror 7 serving as the deflecting unit extends. For simplifying the figure, optical-path bending mirrors on optical paths leading from the polygon mirror 7 to scanning surfaces 11Y, 11M, 11C, and 11K, which are optical scanning positions, are not shown and the optical paths are depicted as if they were on a plane.

The optical scanning device according to the embodiment scans each of the scanning surfaces 11Y, 11M, 11C, and 11K with a plurality of light beams. The scanning surfaces 11Y, 11M, 11C, and 11K are, in concrete terms, "the photosensitive surfaces of photoconductive photosensitive drums". Electrostatic latent images formed on the four photosensitive drums are developed separately with magenta toner, yellow toner, cyan toner, and black toner, and resultant toner images of four colors are superimposed one on top of the other, whereby a full-color image is formed. In the following description, the scanning surfaces and the photosensitive drums that are the substances of the scanning surfaces will be denoted by the same reference numerals (11Y, 11M, 11C, and 11K).

In FIG. 2, reference numerals 1Y, 1M, 1C, and 1K denote "laser light sources". The laser light sources 1Y and 1M are arranged to overlap each other in the sub-scanning direction perpendicular to the plane of FIG. 2. Each light-emitting source of the laser light source 1M is modulated in light intensity by "an image signal corresponding to a magenta image", and each light-emitting source of the laser light source 1Y is modulated in light intensity by "an image signal corresponding to a yellow image".

Likewise, the laser light sources 1C and 1K are arranged to overlap each other in the sub-scanning direction. Each light-emitting source of the laser light source 1C is modulated in light intensity by "an image signal corresponding to a cyan image", and each light-emitting source of the laser light source 1K is modulated in light intensity by "an image signal corresponding to a black image".

Light beams emitted from the laser light sources 1Y and 1M are converted into weak divergent beams through coupling lenses 3Y and 3M, pass through apertures 12Y and 12M, and then fall on cylindrical lenses 5Y and 5M aligned (to overlap each other) in the sub-scanning direction, respectively, where light beams are focused in the sub-scanning direction to be incident on the polygon mirror 7.

The coupling lenses 3Y and 3M are arranged to overlap each other in the sub-scanning direction and receive incident light beams from the laser light sources 1Y and 1M. The apertures 12Y and 12M are arranged to overlap each other in the sub-scanning direction and carry out shielding of the peripheral light-beam region of each light beam (beam shaping).

The cylindrical lenses 5Y and 5M focus the light beams into a plurality of "linear images elongated in the main-scanning direction" near deflecting reflection surface of the polygon mirror 7, from which the plurality of deflected light beams travel to pass scanning lenses 8Y and 8M, which act on the light beams to form beam spots on the scanning surfaces 11Y and 11M. Thus, the scanning surfaces 11Y and 11M are scanned with the beam spots.

Likewise, light beams emitted from the laser light sources 1C and 1K are converted into weak divergent beams through coupling lenses 3C and 3K, passes through apertures 12C and 12K, and then fall on cylindrical lenses 5C and 5K aligned in the sub-scanning direction, where the light beams are focused in the sub-scanning direction to be incident on the polygon mirror 7. Having been deflected by the polygon mirror 7, the light beams travel to pass scanning lenses 8C and 8K, which act on the light beams to form beam spots on the scanning surfaces 11C and 11K. Thus, the scanning surfaces 11C and 11K are scanned with the beam spots.

FIG. 3 is a schematic diagram of an image forming apparatus using the optical scanning device shown in FIG. 2. The portion denoted by reference numeral 20 in FIG. 3 corresponds to "the optical scanning device" described with reference to FIG. 2.

The polygon mirror 7 has four deflecting reflection surfaces, and is of a two-tier structure as shown in FIG. 3. One of light beams deflected at the upper tier of the polygon mirror 7 is guided through an optical path bent by optical-path bending mirrors mM1, mM2, and mM3 to the photosensitive drum 11M. The other light beam is guided through an optical path bent by optical-path bending mirrors mC1, mC2, and mC3 to the photosensitive drum 11C.

One of light beams deflected at the lower tier of the polygon mirror 7 is guided through an optical path bent by an optical-path bending mirror mY to the photosensitive drum 11Y. The other light beam is guided through an optical path bent by an optical-path bending mirror mK to the photosensitive drum 11K.

Thus, the photosensitive drums 11Y, 11M, 11C, and 11K are scanned with light beams from the laser light sources 1Y, 1M, 1C, and 1K, respectively. The photosensitive drums 11Y, 11M, 11C, and 11K are rotated clockwise at constant velocity, are uniformly charged by charging rollers TY, TM, TC, and TK, which serve as charging units, and are scanned with the corresponding light beams to write a yellow image, a magenta image, a cyan image, and a black image onto the photosensitive drums 11Y, 11M, 11C, and 11K, respectively, where the corresponding electrostatic latent images (negative latent images) are formed.

The electrostatic latent images are developed in reverse by developing devices GY, GM, GC, and GK to form a yellow toner image, a magenta toner image, a cyan toner image, and a black toner image on the photosensitive drums 11Y, 11M, 11C, and 11K, respectively.

The toner images of respective colors are transferred onto an intermediate transfer belt 17. That is, to the intermediate transfer belt 17, the yellow toner image is transferred from the photosensitive drum 11Y by a transfer unit 15Y, and the magenta toner image, the cyan toner image, and the black toner image are transferred sequentially from the photosensitive drums 11M, 11C, and 11K by transfer units 15M, 15C, and 15K, respectively.

In this manner, the toner images of yellow, magenta, cyan, and black are sequentially superimposed on the intermediate transfer belt 17 to form a full-color image. The full-color image is transferred onto a printing sheet, and then fixed by a fixing device (not shown) to the printing sheet. Alternatively, the toner images can be directly formed and fixed onto a printing sheet instead of use of the intermediate transfer belt 17.

In FIG. 3, the scanning lenses 8Y and 8M, on which light beams deflected to the right from the polygon mirror 7 are incident, are separated from each other. However, the scanning lenses 8Y and 8M can be stacked together into a two-tier structure. The scanning lenses 8C and 8K, on which light beams deflected to the left from the polygon mirror 7 are incident, can also be stacked together into a two-tier structure.

In the optical scanning device described above, the scanning lens (the scanning lens 8 and the scanning lenses 8Y to 8K) is constituted of one scanning lens. However, it is applicable to employ an f( ) lens constituted of two or more scanning lenses in the optical scanning device, as has been widely employed in the conventional technologies.

The aperture (the aperture 12 and the apertures 12Y to 12K) is employed to perform beam shaping to effectively suppress fluctuation in beam spot size as described above. However, when the aperture is provided, light diffraction at the aperture affects the beam profile of a beam spot, turning the beam profile to "the profile with a side-lobe accompanying a main lobe".

Meanwhile, light diffraction also occurs due to a phase distribution of the phase optical element. As a result, the beam profile of a beam spot on a focusing surface is to be "formed under the complex effect of light diffraction by the aperture and light diffraction by the phase optical element". Thus, "an increase in a beam spot size can be suppressed and the shrinkage of a depth allowance can be effectively reduced or prevented" by making a proper pair of the phase distribution of the phase optical element and the shape of the aperture opening.

As described above, the aperture opening is generally formed into "a rectangular shape or an elliptical shape". When the aperture opening is formed into a rectangular shape, a beam profile on the scanning surface corresponds to "a beam profile in which a side-lobe having a high light intensity occurs in a direction perpendicular to each side of the rectangle of the aperture opening" (e.g., assuming that the sides of the rectangle are made parallel to the main-scanning direction and to the sub-scanning direction, side-lobes occur along the main-scanning direction and the sub-scanning direction). On the other hand, when the aperture opening is formed into an elliptical shape, a beam profile on the scanning surface corresponds to "a beam profile in which side-lobes are distributed around a main lobe".

For "increasing a side-lobe" by using a phase optical element, if an aperture having a rectangular opening is used, "side-lobes with high peak intensities occur only in the main-scanning direction and in the sub-scanning direction". As a result, a beam spot size (the diameter of a light beam including a side-lobe and calculated by using $1/e^2$ as a threshold) is extremely deformed, making it difficult to expand a depth allowance. Furthermore, "the side-lobes having high peak intensities and localized only in a predetermined direction" may degrade quality of images.

If an aperture having an elliptical opening is used, "side-lobes are distributed around a main lobe". Meanwhile, a depth allowance can be expanded "mainly due to side-lobes in the main-scanning direction and in the sub-scanning direction". Therefore, when an aperture having an elliptical opening and a phase optical element are used for expanding a depth allowance, resultant side-lobes contain "side-lobes that are less contributive to expansion of a depth allowance (i.e., side-lobes neither in the main-scanning direction nor in the sub-scanning direction)" with relatively high light intensities. As a result, a depth allowance cannot be effectively expanded.

Even when the amount of increase in a side-lobe is more increased by adjusting a phase distribution of a depth expanding element, "a side-lobe that is less contributive to expansion of a depth allowance" also increases, which is less effective to expand a depth allowance. Furthermore, because the light intensity of the side-lobes as a whole increases, "the light intensity of a main lobe that contributes to image forming decreases", making it difficult to increase a processing speed.

As described above, it is preferable to form "a beam profile in which side-lobes are moderately localized in the main-scanning direction and in the sub-scanning direction" on the scanning surface. With use of such a beam profile, a depth allowance can be more expanded than a case of use of a beam profile obtained through an aperture having "a rectangular aperture opening or an elliptical aperture opening" together with a phase optical element.

The inventors of the present invention found that "the shape of an aperture opening" that satisfies the following condition is the most preferable to form the above-mentioned beam profile.

$$0.03 \leq (SR-SA)/SR \leq 0.20$$

where SR is area of a rectangle circumscribing the aperture opening and SA is area of the aperture opening.

Hereinafter, a percentage α of the parameter of the above condition is referred to as "a light shielding rate α", which is obtained by $$\alpha = \{(SR-SA)/SR\} \times 100 \; (\%)$$

Figure 15:
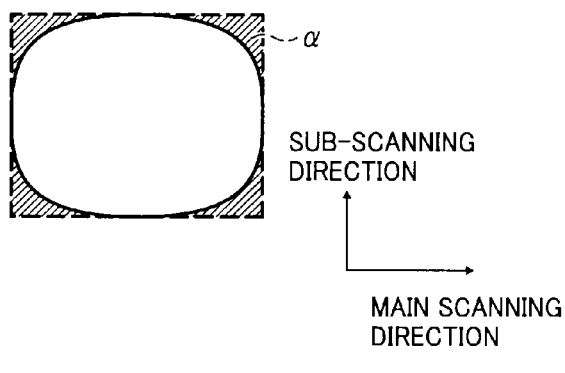
FIG. 15 is a schematic diagram for explaining a shape of an opening of an aperture and a light shielding rate of the aperture according to the embodiment.

FIG. 15 is a schematic diagram for explaining a shape of an aperture opening and a light shielding rate of an aperture according to the embodiment.

In FIG. 15, the shape depicted by a solid line is "the shape of the aperture opening", and its area is represented by "SA" as described above. The rectangle depicted by a dashed line is "the rectangle circumscribing the aperture opening", and its area is represented by "SR" as described above.

"Portions covered by hatched lines" are collectively referred to as a light shielding portion and its area is represented by "SR−SA". The ratio (%) of the light shielding portion to the area SR of the circumscribed rectangle is the light shielding rate α.

The inventors found that a depth expanding function of a phase optical element can be effectively enhanced by adjusting the light shielding rate α.

As a value of the light shielding rate α is made smaller, a beam profile on the scanning surface becomes similar to "the beam profile obtained by using an aperture having "a rectangular aperture opening". On the other hand, as a value of the light shielding rate α is made larger, a beam profile on the scanning surface becomes similar to "the beam profile obtained by using an aperture having "an elliptical aperture opening" (the light shielding rate α of 21.5% is kept constant in the elliptical aperture opening). It is preferable to arrange the light shielding portion ("portions covered by hatched lines" in FIG. 15) at four corners of the rectangle as shown in FIG. 15.

If the light shielding rate α is set to from 3% to 20% as described above, "the beam profile in which side-lobes are moderately localized in the main-scanning direction and in the sub-scanning direction" can be formed. Thus, it is possible to effectively expand a depth allowance while decrease in the light intensity of a main lobe can be suppressed.

If the light shielding rate α is set to smaller than 3%, such a beam profile is obtained that "the side-lobes are localized" as described above. As a result, a beam spot size is extremely deformed. On the other hand, if the light shielding rate α is set to larger than 20%, "the side-lobes are excessively distributed". As a result, a depth allowance cannot be effectively expanded and the light intensity of a main lobe decreases, resulting in making it difficult to increase a processing speed. The above situations will be described in detail later with values obtained through experiments.

To obtain "the beam profile in which side-lobes are moderately localized in the main-scanning direction and in the sub-scanning direction", it is preferable to form an aperture such that "at least a portion of an aperture opening overlaps with a boundary between an ellipse and a rectangle circumscribing the ellipse".

Preferable examples of the shape of an aperture opening according to the embodiment are described below.

Figure 16A:
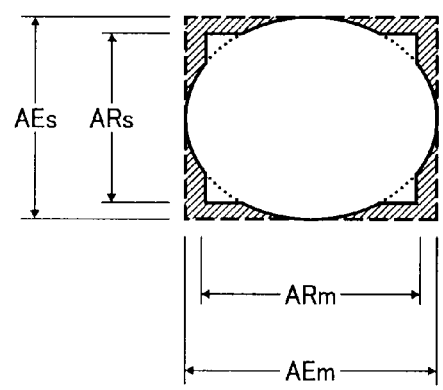
FIGS. 16A to 16C are schematic diagrams for explaining a shape of an aperture opening (type A) according to the embodiment.
Figure 16B:
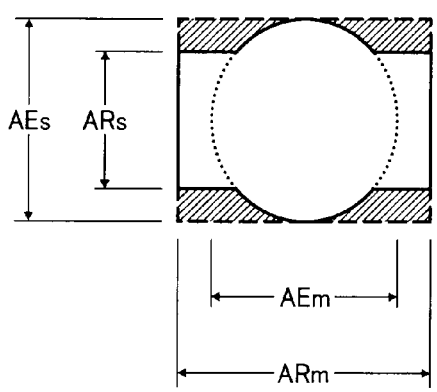

FIGS. 16A to 16B are schematic diagrams of aperture openings each being formed of an elliptical arc having a major axis AEm and a minor axis AEs and a rectangle having a long side ARm and a short side ARs.

Figure 16C:
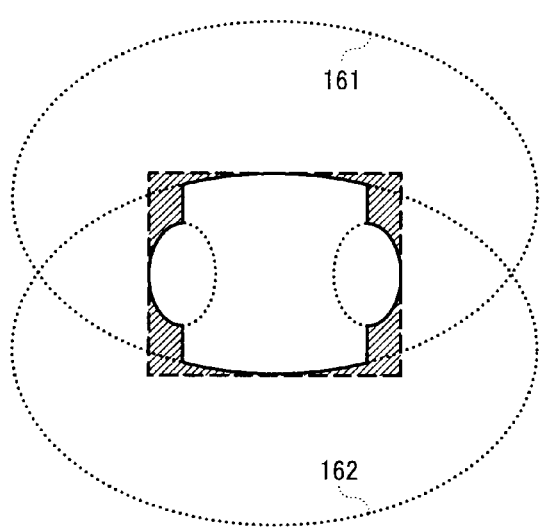

FIG. 16C is a schematic diagram of an aperture opening formed such that each side in the main-scanning direction (a horizontal direction of FIG. 16C) is formed of a straight line and a portion of an elliptical arc, and each side in the sub-scanning direction (a vertical direction of FIG. 16C) overlaps with "a portion of an ellipse 161 or an ellipse 162 each having a curvature radius different from those of the elliptical arcs of the edges in the main-scanning direction". In FIGS. 16A to 16C, each of the rectangles depicted by dashed lines is "the rectangle circumscribing the aperture opening".

The shape of the aperture opening depicted in each of FIGS. 16A to 16C corresponds to "a shape formed of two or more different lines selected from a circular arc, an elliptical arc, and a straight line". Hereinafter, such a shape is referred to as "type A".

Figure 17:
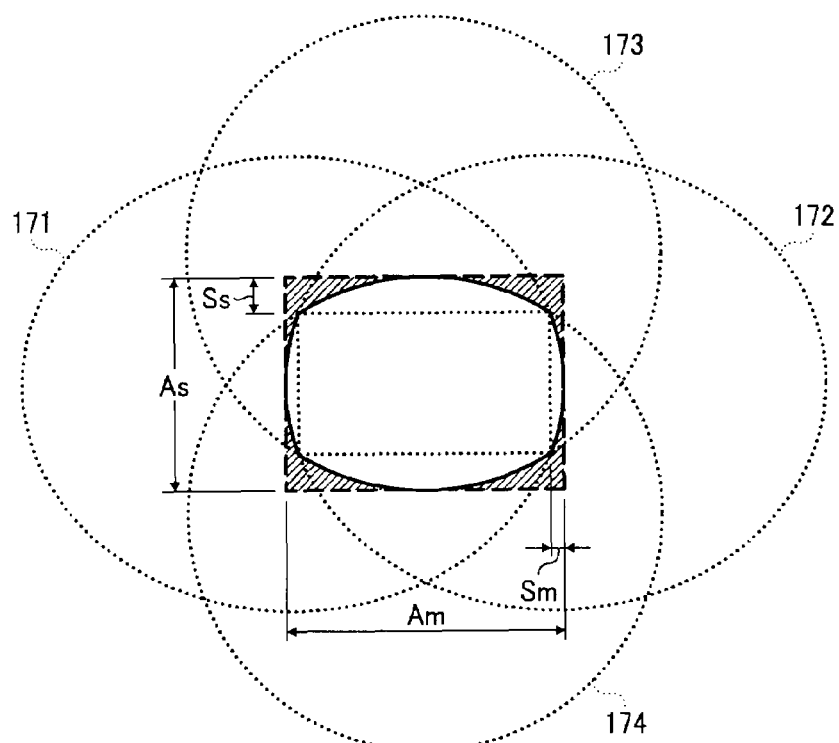
FIG. 17 is a schematic diagram for explaining a shape of an aperture opening (type B) according to the embodiment.

FIG. 17 is a schematic diagram of an aperture opening formed of a plurality of circular arcs and elliptical arcs. More particularly, each side in the vertical direction is formed of a portion of an elliptical arc of each of an ellipse 171 and an ellipse 172, and each side in the horizontal direction is formed of a portion of a circular arc of each of a circle 173 and a circle 174. Hereinafter, such a shape is referred to as "type B". In FIG. 17, the rectangle depicted by dashed lines is "the rectangle circumscribing the aperture opening".

Figure 18:
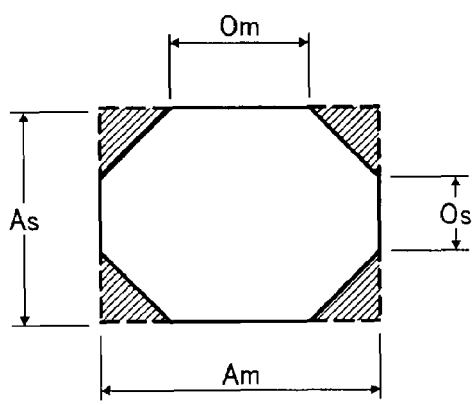
FIG. 18 is a schematic diagram for explaining a shape of an aperture opening (type C) according to the embodiment.

FIG. 18 is a schematic diagram of an aperture opening having an octagon shape. Hereinafter, such a shape is referred to as "type C". In FIG. 18, the rectangle depicted by dashed lines is "the rectangle circumscribing the aperture opening". Reference symbols Om indicates a length of a line parallel to the main-scanning direction and Os indicates a length of a line parallel to the sub-scanning direction. Reference symbols Am indicates a length of edges of the rectangle in the main-scanning direction and As indicates a length of edges of the rectangle in the sub-scanning direction. Reference symbols ORm and ORs represent ratio of Om and Os with respect to sides of the rectangle.

Figure 19:
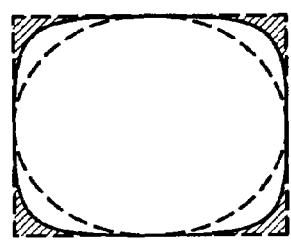
FIG. 19 is a schematic diagram for explaining a shape of an aperture opening (type D) according to the embodiment.
Figure 20A:
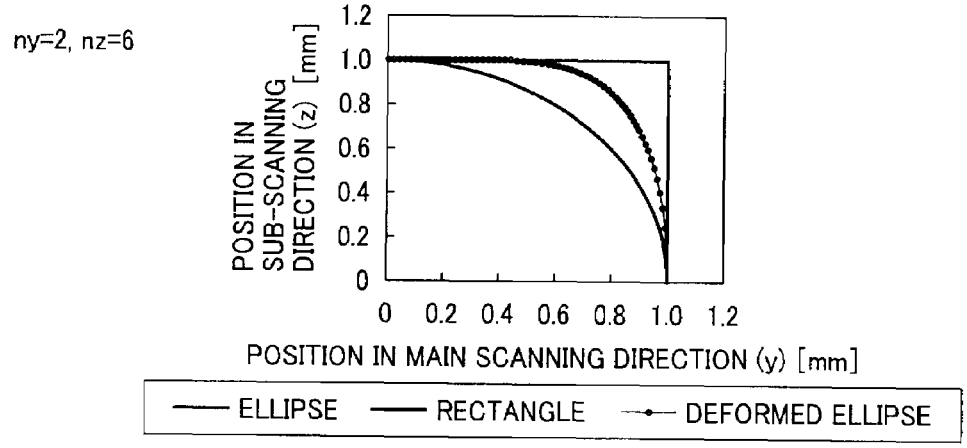
FIGS. 20A to 20E are graphs for explaining shapes of the aperture opening shown in FIG. 19 with respect to different parameters.
Figure 20B:
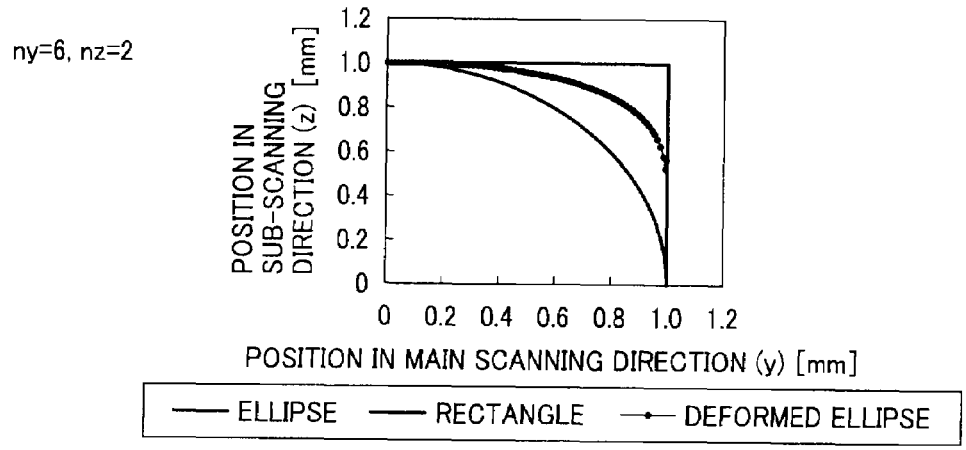
Figure 20C:
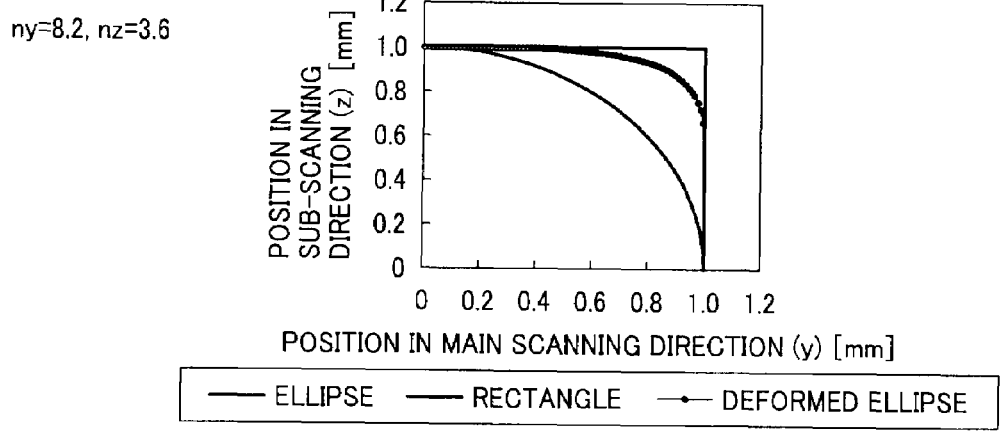
Figure 20D:
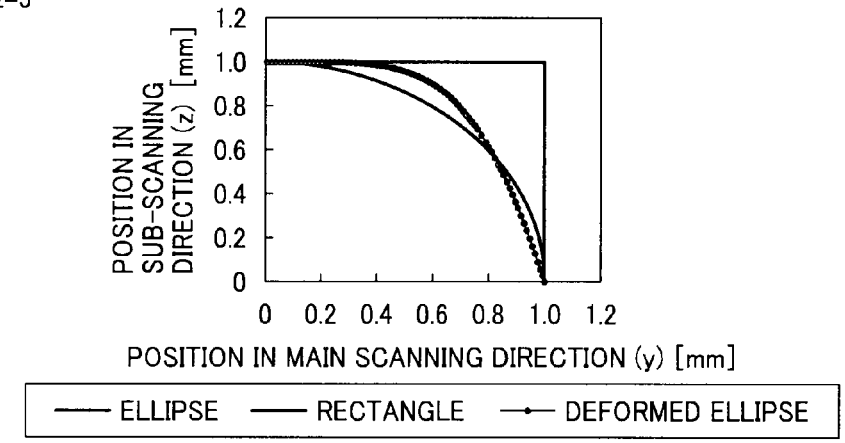
Figure 20E:
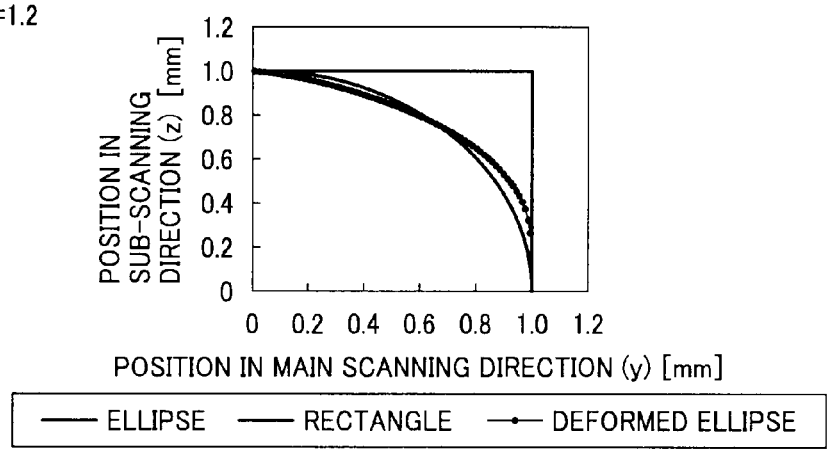
Figure 22C:
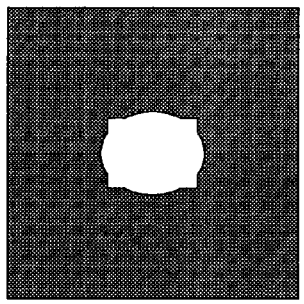
Figure 22C:
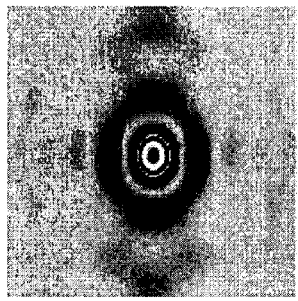
Figure 22D:
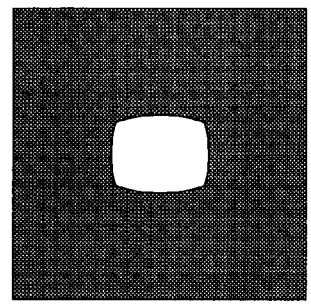
Figure 22D:
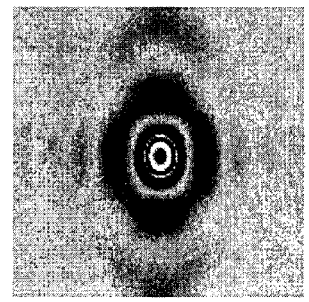
Figure 22E:
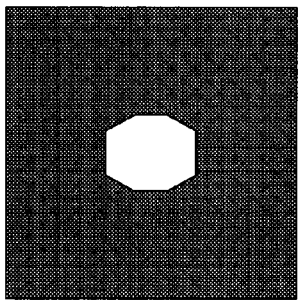
Figure 22E:
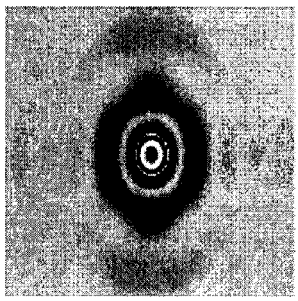
Figure 22F:
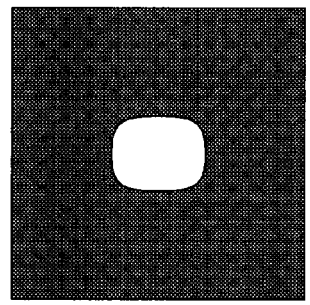
Figure 22F:
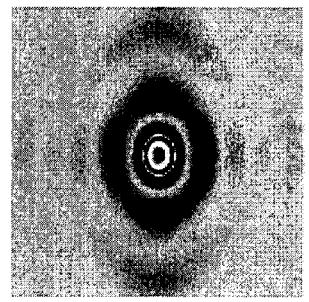

The shape of the aperture opening shown in FIG. 19 corresponds to a shape defined in claim 5. In FIG. 19, the rectangle depicted by dashed lines is "the rectangle circumscribing the aperture opening".

In the above description, "the main-scanning direction" corresponds to a horizontal direction and "the sub-scanning direction" corresponds to a vertical direction with respect to each figure.

Assuming that the aperture opening shown in FIG. 19 is represented by the coordinates whose origin is set to the center of the aperture opening with y-axis extending along a horizontal direction (the main-scanning direction) and z-axis extending along a vertical direction (the sub-scanning direction), the shape of the aperture opening in the first quadrant of the coordinates satisfies the following Equation A. That is, $$z = b(1-(y/a)^{nz})^{(1/ny)} \quad (A)$$

where 2a is "width in the main-scanning direction", 2b is "width in the sub-scanning direction", and ny and nz are positive real numbers (deformation ellipse orders). Furthermore, the whole shape of the aperture opening can be obtained based on the shape in the first quadrant such that the shape in the first quadrant is folded back with respect to the y-axis and then a resultant shape over the first and the fourth quadrants is folded back with respect to the z-axis.

When each of the deformation ellipse orders ny and nz is set to two, an ellipse is obtained. When each of the deformation ellipse orders ny and nz is set to ∞, a rectangle is obtained. Furthermore, as the value of ny increases, the shape of edges in the main-scanning direction (the edges in the horizontal direction) approaches a line. Likewise, as the value of nz increases, the shape of edges in the sub-scanning direction (the edges in the vertical direction) approaches a line.

Hereinafter, such a shape is referred to as "type D".

It is preferable to form the shape defined by Equation A to be overlapped with at least a portion of an aperture opening. It is more preferable to "the shape of an aperture opening corresponds to the shape defined by Equation A". The shape defined by Equation A can form other shapes by line-symmetric displacement or rotational transfer as described above.

FIGS. 20A to 20E are graphs with respect to different values of deformation ellipse orders ny and nz. In the graphs, it is assumed that a=b=1. The shapes of deformed ellipses, "ellipses, and rectangles are depicted by bold solid lines". It is noted that the shape of the aperture opening defined in claim 5 needs not be completely the same as that defined by Equation A, and substantially the same shapes are also applicable.

A result of a simulation carried out by using an optical system related to a configuration of the optical scanning device as described with reference to FIG. 1 is described below. As mentioned earlier, the scanning lens 8 is made of resin, and input of a light beam from the laser light source 1 to the polygon mirror 7 and output of a deflected light from the polygon mirror 7 are carried out through a parallel plate glass that covers a window of an insulating casing (not shown in FIG. 1) housing the polygon mirror 7. In FIG. 1, a vertical direction of the figure corresponds to the main-scanning direction and a chief ray of a light beam incident from the laser light source 1 onto the polygon mirror 7 is inclined at 34 degrees with respect to the main-scanning direction. That is, when a normal line of the deflecting reflection surface is inclined at 34 degrees with respect to the optical axis of the scanning lens in a direction of a rotation axis of the polygon mirror 7, a deflected light beam becomes parallel to the optical axis.

The scanning lens 8 is formed to have an incident surface (the first surface) and an output surface (the second surface) obtained by the following Equation (1) and Equation (2), where Rm0 is paraxial curvature radius in the main-scanning direction (curvature is Cm0=1/Rm0), Rs0 is paraxial curvature radius in the sub-scanning direction (curvature is Cs0), a00, a01, a02, . . . , b01, b02, b03, . . . are parameters, X is optical axis direction, Y is main-scanning direction, and Z is sub-scanning direction.

$$X(Y,Z)=Cm0 \cdot Y^2/(1+\nu(1(1+a00) \cdot Cm0^2 \cdot Y^2))]+a01 \cdot Y+a02 \cdot Y^2+a03 \cdot Y^3+a04 \cdot Y^4+ \ldots +Cs(Y) \cdot Z^2/[1+\nu\{1Cs(Y)^2 \cdot Z^2\}] \quad (1)$$

where $$Cs(Y)=Cs0+b01 \cdot Y+b02 \cdot Y^2+b03 \cdot Y^3+Cm0=1/Rm0, \quad Cs0=1/Rs0 \quad (2)$$

The coupling lens 3 is formed to have an incident surface that is a plane surface and an output surface that is a rotationally symmetric aspheric surface, which is obtained by the following Equation 3.

$$X(H)=C \cdot H^2/[1+\nu\{1(1+K) \cdot C^2 \cdot H^2\}]+A2 \cdot H^2+A3 \cdot H^3+ \quad (3)$$

where C=1/R.

The cylindrical lens 5 is formed to have an incident surface that is a cylindrical surface having a curvature only in the sub-scanning direction and an output surface that is a plane surface.

Data about the incident surface (the first surface) and the output surface (the second surface) of the scanning lens 8 and the incident surface of the cylindrical lens 5 is provided in the following Table 1.

TABLE 1

|  | First surface of scanning lens | Second surface of scanning lens | Cylindrical lens (incident surface) |
| --- | --- | --- | --- |
| Rm0 | 200 | −196.881 | 0 |
| Rs0 | 130 | −24.955 | 24.51 |
| a00 | 0.0000E+00 | 0.0000E+00 | — |
| a04 | −1.2707E−06 | −5.5974E−07 | — |
| a06 | −1.0378E−10 | −1.3122E−10 | — |
| a08 | 6.2178E−13 | 1.9439E−14 | — |
| a10 | −4.2675E−16 | 8.3171E−17 | — |
| a12 | 1.2571E−19 | −5.0072E−20 | — |
| a14 | −1.3454E−23 | 8.6251E−24 | — |
| b01 | — | −1.4016E−05 | — |
| b02 | — | 7.2676E−06 | — |
| b03 | — | −3.8531E−09 | — |
| b04 | — | −3.2680E−09 | — |
| b05 | — | 1.9064E−12 | — |
| b06 | — | 1.0300E−12 | — |
| b07 | — | −4.2941E−16 | — |
| b08 | — | −1.4822E−16 | — |

In Table 1, description of "−1.4822E−16" means "−1.4822×10$^{-16}$". The same is applied to other descriptions above and below.

Data about a surface interval (distance) between optical elements located on a path from a light source to a focusing surface (a scanning surface) is provided in the following Table 2.

TABLE 2

|  | Distant to next surface [mm] |
| --- | --- |
| Light source | 12.455 |
| Coupling lens |  |
| Incident surface | 2.98 |
| Output surface | 9.495 |
| Aperture | 12.4 |

TABLE 2-continued

|  | Distant to next surface [mm] |
| --- | --- |
| Cylindrical lens |  |
| Incident surface | 3 |
| Output surface | 47.433 |
| Polygon mirror (inclination angle of 34 degrees) | 42.191 |
| Scanning lens |  |
| Incident surface | 18 |
| Output surface | 200.898 |
| Focusing surface | — |

In Table 2, "light source" corresponds to the laser light source 1, and "focusing surface" corresponds to the scanning surface 11. It can be found from Table 2 that the aperture 12 is arranged between the coupling lens 3 and the cylindrical lens 5, and the phase optical element 13 is brought closer to the output surface of the aperture 12.

The wavelength of the light sources is set to 655 nanometers.

Data about the output surface of the coupling lens is provided in the following Table 3.

TABLE 3

|  | Coupling lens (Output surface) |
| --- | --- |
| R | −7.4212 |
| K | −1.534699 |
| A4 | −3.0167E−04 |
| A6 | 5.6311E−06 |
| A8 | −1.8261E−06 |
| A10 | 2.0459E−07 |

The coupling lens 3 is a glass lens (with a refractive index of 1.515141). Each of the cylindrical lens 5 and the scanning lens 8 is a resin lens (with a refractive index of 1.527257) and having a lateral magnification rate of about minus 3.7 times as large in the sub-scanning direction. In Table 1, Table 2, and Table 3, "values that have dimension of length" are represented in unit of millimeters.

It is assumed that the phase optical element 13 is configured as shown in FIG. 21. Specifically, the phase optical element 13 has a phase distribution of "an elliptical shape indicated by hatched lines", in which a width in the main-scanning direction (a horizontal direction in the figure; hereinafter, referred to as "a main-scanning width" as appropriate) is set to 1.42 millimeters, and a width in the sub-scanning direction (a vertical direction in the figure; hereinafter, referred to as "a sub-scanning width" as appropriate) is set to 0.40 millimeter. Furthermore, the phase distribution is formed such that "the elliptical shape has a height h downward from the surface of a parallel plate substrate". The depth h is determined to give a phase distribution of $\pi$ radian with respect to an operation wavelength of 655 nanometers. Therefore, when a refractive index of the substrate is set to 1.457093, the height h becomes 0.716 micrometer.

A laser light beam incident on the aperture 12 has an elliptical cross section whose size (defined by 1/e$^2$) is determined by the main-scanning width of 6.721 millimeters and the sub-scanning width of 1.767 millimeters.

Simulations were performed to examine what beam profile is formed with respect to each of "the apertures having aperture openings of type A to type D" on assumption that the phase optical element shown in FIG. 21 is brought closer to each of the apertures in the above-mentioned optical scanning device. Furthermore, as comparative examples, simulations were also performed with respect to each of "the apertures having a rectangular aperture opening" and "the apertures having an elliptical aperture opening".

FIGS. 22A to 22F are diagrams representing results of the simulations. In each of FIGS. 22A to 22F, the shape of the aperture opening is "outlined on a colored background". Figures below the figures of the aperture openings represent beam profiles (intensity distribution) on the scanning surface (focusing surface). A horizontal direction corresponds to "the main-scanning direction" and a vertical direction corresponds to "the sub-scanning direction" with respect to each figure. Sizes of the aperture openings will be described later.

FIG. 22A depicts a result of a simulation using a rectangular aperture (light shielding rate $\alpha$ is zero). In this case, first-order side-lobes occur in the main-scanning direction and in the sub-scanning direction. FIG. 22B depicts a result of a simulation using an elliptical aperture. In this case, first-order side-lobes occur around a main lobe.

FIGS. 22C to 22F depict results of simulations using apertures having aperture openings of type A to type D (indicated in figures), respectively. In these cases, "side-lobes are not extremely localized in the main-scanning direction and in the sub-scanning direction" compared with the case of FIG. 22A. Furthermore, "side-lobes are more converged in the main-scanning direction and in the sub-scanning direction" compared with the case of FIG. 22B. Thus, "a beam profile in which side-lobes are moderately localized in the main-scanning direction and in the sub-scanning direction" is formed, which is preferable for expanding a depth allowance.

Detailed data obtained by the simulations are described below with reference to FIGS. 23 to 27.

In the following description and tables of FIGS. 23 to 27, a beam spot size represents a "result of calculation at an image height at the center of a beam spot (the center of a scanning area) (in the sub-scanning direction)". However, the same can be applied to an image height at edges of the beam spot. The beam spot size (in unit of micrometers) is calculated at a design median and at a value obtained on assumption that a focusing position in the sub-scanning direction is shifted towards an optical axis by 8 millimeters (far side from the light source) (in the figures, indicated by "sub-scanning width+8 mm")". When a difference between the above two beam spot sizes (in the figures, indicated by "amount of increase in beam spot size") becomes smaller, less fluctuation in a beam spot size occurs, resulting in "increasing a depth allowance". "A side-lobe peak" indicates a light intensity of a side-lobe adjacent to a main lobe. More particularly, the side-lobe peak represents a value of a light intensity in the sub-scanning direction at a design median. Further, "$\alpha$" is the above-mentioned "light shielding rate". The beam spot size is "calculated using $1/e^2$ as a threshold in a beam profile of a cross section at a gravity center".

FIG. 23 is a table containing data obtained by the simulation using the apertures having a rectangular aperture opening and an elliptical aperture opening, when the phase optical element shown in FIG. 21 is used and when the same is not used. In FIG. 23, "main-scanning width" indicates a width in the main-scanning direction and "sub-scanning width" indicates a width in the sub-scanning direction with respect to each aperture opening. In case of the elliptical aperture opening, the "main-scanning width" corresponds to a main axis and the "sub-scanning width" corresponds to a minor axis.

The light shielding rate $\alpha$ is set to zero for the rectangular aperture opening and set to 21.4% for the elliptical aperture opening. Conventionally, the rectangular aperture opening and the elliptical aperture opening have been widely used without using a phase optical element. However, it can be found from FIG. 23 that "the amount of increase in a beam spot size is extremely large" in the simulation under the same condition as that of the conventional case. If the phase optical element is used with the rectangular aperture opening, the light intensity of side-lobes becomes too high to effectively expand a depth allowance. On the other hand, if the phase optical element is used with the elliptical aperture opening, the amount of increase in a beam spot size is largely reduced", resulting in expanding a depth allowance.

FIG. 24 is a table containing data obtained by the simulation using the aperture having an aperture opening of type A with the phase optical element shown in FIG. 21. Compared with "the amount of increase in a beam spot size (13.7 micrometers) in a case where the elliptical aperture opening is used with the phase optical element (see FIG. 23)", "the amount of increase in a beam spot size is suppressed" in all cases shown in FIG. 24.

FIG. 25 is a table containing data obtained by the simulation using the aperture having an aperture opening of type B with the phase optical element shown in FIG. 21. Similar to the above, when compared with "the amount of increase in a beam spot size (13.7 micrometers) in a case where the elliptical aperture opening is used with the phase optical element (see FIG. 23)", "the amount of increase in a beam spot size is suppressed" in all cases shown in FIG. 25.

FIG. 26 is a table containing data obtained by the simulation using the aperture having an aperture opening of type C with the phase optical element shown in FIG. 21. Similar to the above, when compared with "the amount of increase in a beam spot size (13.7 micrometers) in a case where the elliptical aperture opening is used with the phase optical element (see FIG. 23)", "the amount of increase in a beam spot size is suppressed" in all cases shown in FIG. 26.

FIG. 27 is a table containing data obtained by the simulation using the aperture having an aperture opening of type D with the phase optical element shown in FIG. 21. Similar to the above, when compared with "the amount of increase in a beam spot size (13.7 micrometers) in a case where the elliptical aperture opening is used with the phase optical element (see FIG. 23)", "the amount of increase in a beam spot size is suppressed" in most of the cases shown in FIG. 27 except for a case where the light shielding rate $\alpha$ is set to 2.1%.

In this manner, when the phase optical element for expanding a depth allowance is used with "an aperture having an aperture opening with a light shielding rate $\alpha$ of from 3% to 20%", the amount of increase in a beam spot size can be suppressed compared with cases where a conventional aperture having a rectangular aperture opening or an elliptical aperture opening is used". As a result, "the effect to efficiently expand a depth allowance" can be achieved.

It can be found from FIGS. 23 to 27 that a depth allowance can be more effectively expanded as the light shielding rate $\alpha$ is set smaller. However, if the light shielding rate $\alpha$ is set too small, fluctuation in a beam spot size largely occurs due to the effect of a manufacturing error. Furthermore, the small light shielding rate $\alpha$ leads to "increase in the light intensities of side-lobes". The side-lobes having extremely high light intensities may degrade quality of images. Therefore, it is preferable to set the peak intensity of a side-lobe to be "10% or less of the peak intensity of a main lobe" to prevent degradation of image forming operations. To obtain the above-mentioned peak intensity, it is preferable to set the light shielding rate $\alpha$ to 7% or larger.

On the other hand, if the light shielding rate $\alpha$ is set too large, an area of an aperture opening is made smaller. As a result, light use efficiency in optical scanning decreases, making it difficult to increase a processing speed of optical scanning. Thus, it is preferable to set the light shielding rate α to be not too large. It can be found from FIG. 25 that the amount of increase in a beam spot size is not much reduced (i.e., the effect for expanding a depth allowance) when the light shielding rate α exceeds 16.7%. Furthermore, it can be found from FIG. 26 that the amount of increase in a beam spot size is not much reduced when the light shielding rate α exceeds 18.1%. Moreover, it can be found from FIG. 27 that the amount of increase in a beam spot size is not much reduced when the light shielding rate α exceeds 16.4%. Therefore, it is preferable to set the light shielding rate α to be 16% or smaller.

The phase optical element can be arranged "at any position on the side of a light source from a deflecting unit". However, it is more preferable to place the phase optical element "between a coupling lens and a cylindrical lens". The phase optical element can be integrated with an aperture, the coupling lens, or the cylindrical lens. Furthermore, it is applicable to arrange a diffraction lens surface on one optical surface of either the coupling lens or the cylindrical lens, and integrate the phase optical element for expanding a depth allowance with that diffraction lens surface.

One feature of the present invention is described in more detail below.

In a typical optical scanning device, an edge-emitting laser or a surface emitting laser is used as a light source. The edge-emitting laser emits a light beam having an elliptical far-field pattern. The surface emitting laser emits a light beam having a circular far-field pattern.

Meanwhile, "a ratio of a beam width in the main-scanning direction to a beam width in the sub-scanning direction" of a light beam to be incident on an aperture does not correspond to "a ratio of a width in the main-scanning direction to a width in the sub-scanning direction of an opening of the aperture". It may be possible to set the ratios to be the same to each other by properly arranging optical elements and setting proper curvatures in a scanning optical system. However, this approach is not practical because of a number of restrictions imposed on optical layouts.

If "the ratio of a beam width in the main-scanning direction to a beam width in the sub-scanning direction" of a light beam to be incident on an aperture does not correspond to "the ratio of a width in the main-scanning direction to a width in the sub-scanning direction of an aperture opening", either the light intensity PAm at an edge of the aperture opening in the main-scanning direction (at a cross section of the center of the aperture opening) or the light intensity PAs at an edge of the aperture opening in the sub-scanning direction decreases. If the light intensity PAm or the light intensity PAa decreases, a diffraction effect in a corresponding direction (either the main-scanning direction or the sub-scanning direction) is reduced, reducing a side-lobe of a beam spot on the scanning surface. As a result, a depth allowance shrinks.

Even if a phase optical element is added to increase side-lobes, the amount of increase is remained low. Therefore, a depth allowance cannot be effectively expanded.

It may also be possible to increase a smaller one of the light intensities PAm and PAs by enlarging a size of a cross section of a light beam incident on the aperture. For example, the size of the cross section can be enlarged by increasing a focal length of a coupling lens. However, this configuration leads to decrease in the light intensity of a light beam passing through the aperture opening. Therefore, it becomes difficult to increase a processing speed of optical scanning, which is not preferable.

One approach to address the above situation is to "reduce" curvatures of edges of the aperture opening in a direction different from a direction corresponding to a smaller one of the light intensities PAm and PAs (if PAm>PAs is satisfied, edges of the aperture opening in the main-scanning direction) so that the edges are formed into substantially linear shapes. Detailed explanation is given below with reference to FIG. 28.

Figure 28:
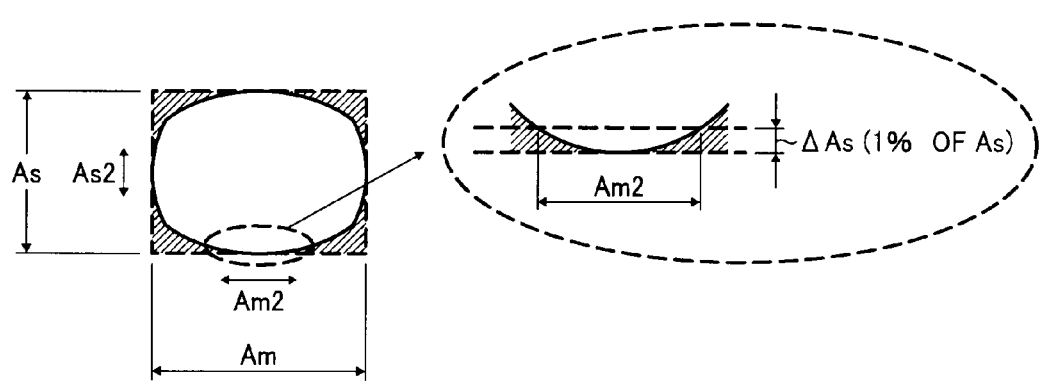
FIG. 28 is a schematic diagram for explaining details about a shape of an aperture opening according to the embodiment.

As shown in FIG. 28, if the following relationships are satisfied, a depth allowance can be effectively expanded without imposing restriction on optical layouts or reducing the light intensity of a light transmitting the aperture opening. That is, when PAm>PAs is satisfied, Am2/Am>As2/As is to be satisfied, and when PAm<PAs is satisfied, Am2/Am<As2/As is to be satisfied where Am is main-scanning width of a rectangle circumscribing the aperture opening, As is sub-scanning width of the rectangle; ΔAm is 1% of the main-scanning width Am, ΔAs is 1% of the sub-scanning width As, Am2 is partial width of the rectangle in the main-scanning direction between intersecting points between "a line parallel to the main-scanning direction" drawn inside the rectangle by ΔAs with respect to the sub-scanning width As and the aperture opening, and As2 is partial width of the rectangle in the sub-scanning direction between intersecting points of "a line parallel to the sub-scanning direction" drawn inside the rectangle by ΔAm with respect to the main-scanning width Am and the aperture opening.

The aperture openings of type B, type C, and type D are preferable because "an area having a substantially linear shape, that is, an area with a small curvature" can be set separately with respect to the main-scanning direction and the sub-scanning direction. Specifically, it is preferable to determine the shape so that the following relationships are satisfied.

That is, for the aperture opening of type B, when PAm>PAs is satisfied, Cm<Cs is to be satisfied, and when PAm<PAs is satisfied, Cm>Cs is to be satisfied where Cm is curvature of either a circular arc or an elliptical arc in the main-scanning direction, and Cs is curvature of either a circular arc or an elliptical arc in the sub-scanning direction.

For the aperture opening of type C, when PAm>PAs is satisfied, Bm>Bs is to be satisfied, when PAs>PAm is satisfied, Bs>Bm is to be satisfied, where Bm is ratio of "a line parallel to the main-scanning direction" of an aperture opening to a main-scanning width of a rectangle circumscribing the aperture opening, and Bs is ratio of "a line parallel to the sub-scanning direction" of the aperture opening to a sub-scanning width of the same rectangle.

For the aperture opening of type D, when PAm>PAs is satisfied, ny>nz is to be satisfied, when PAs>PAm is satisfied, nz>ny is to be satisfied.

Assuming that values shown in FIG. 27 are considered, when (ny, nz) is (4.4, 2), the light intensity of the edges of the aperture opening (PAm, PAs) is (0.888, 0.317). Furthermore, when (ny, nz) is (2, 4.5), (PAm, PAs) is (0.883, 0.328), and when (ny, nz) is (3, 43), (PAm, PAs) is (0.885, 0.317). That is, PAm>PAs is satisfied.

At this state, the light shielding rate α is substantially the same in each case. Thus, when (ny, nz) is (4.4, 2), the expanding amount of the beam spot size is the smallest, which means that a depth allowance is most effectively expanded in this case.

In typical optical scanning devices, if an edge-emitting laser is used as a light source, a far-filed pattern of a light beam emitted from the edge-emitting laser is generally set to be "an ellipse elongated in the main-scanning direction". Therefore, by making a setting so that "PAm>PAs" is satisfied, the light intensity of a light transmitting an aperture opening can be maximized. As described above, this situation can be obtained by forming the edges of the aperture opening in the main-scanning direction into substantially linear shapes (shapes with small curvatures).

If an edge-emitting laser array is used as a light source, it is preferable to shape a light beam incident on an aperture to be elongated in the sub-scanning direction so that beam spots of light beams emitted from the laser array can be formed with preferable intervals on the scanning surface. That is, it is preferable so that "PAm<PAs" is satisfied. This situation can be obtained by forming the edges of the aperture opening in the sub-scanning direction into substantially linear shapes.

On the other hand, if a surface emitting laser or a surface emitting laser array is used as a light source, a far-filed pattern of a light beam emitted from the surface emitting laser or the surface emitting laser array is generally set to be a substantially circular shape. Therefore, by making a setting so that PAm<PAs is satisfied, the light intensity of a light transmitting an aperture opening can be maximized. As described above, this situation can be obtained "by forming the edges of the aperture opening in the main-scanning direction into substantially linear shapes".

If a scanning lens is formed of a single lens, the lateral magnification of the scanning lens in the sub-scanning direction is tend to increase, causing degradation of a beam spot size in the sub-scanning direction. However, with a use of such a scanning lens, the size of the optical scanning device can be reduced. Therefore, to expand a depth allowance and suppress the expanding amount of the beam spot size at the same time, a use of a phase optical element that can expand a depth allowance enables improvement in stabilization of the beam spot size and downsizing of the optical scanning device.

Furthermore, if a scanning lens is formed of a single lens, the lateral magnification of the scanning lens in the sub-scanning direction is tend to increase, increasing a sub-scanning width of an aperture opening. If an edge-emitting laser is used, "the difference between PAm and PAs" tends to increase regardless of a single-beam scanning system or a multibeam scanning system. In this case, therefore, it is preferable to extend linear areas of the aperture opening either in the main-scanning direction or in the sub-scanning direction.

While the tandem color image forming apparatus is used as an example of an image forming apparatus in the above description, the present invention can also be applied to monochrome image forming apparatuses.

According to one aspect of the present invention, it is possible to prevent side-lobes from being localized, having high peak intensities, and being excessively distributed. Therefore, it is possible to suppress reduction in the light intensity of a main lobe. As a result, a depth allowance can be effectively expanded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a laser light source that emits a light beam;
   a coupling lens that couples the light beam;
   an aperture having an aperture opening that transmits a predetermined portion of the light beam;
   a phase optical element that changes a phase of a portion of the light beam coupled by the coupling lens including a center of the light beam;
   a deflecting unit that deflects the light beam transmitted through the aperture for scanning; and
   a scanning lens that focuses the light beam deflected by the deflecting unit into a beam spot on a scanning surface, wherein
   the phase optical element has a function of increasing a light intensity of a side-lobe of the scanning beam near the scanning surface,
   the aperture opening is set to satisfy $$0.03 \leq (SR-SA)/SR \leq 0.20$$

where SR is area of a rectangle circumscribing the aperture opening and SA is area of the aperture opening, and
   the function of the phase optical element and the aperture expand a depth allowance of the beam spot.

2. The optical scanning device according to claim 1, wherein the aperture is formed such that at least a portion of the aperture opening is included between the rectangle and an inscribed ellipse.

3. The optical scanning device according to claim 2, wherein a shape of the aperture opening includes a combination of at least two of a group of a circular arc, an elliptical arc, and a straight line.

4. The optical scanning device according to claim 3, wherein in the aperture opening, either one of an aperture opening edge in the main-scanning direction and an aperture opening edge in the sub-scanning direction whichever having a larger light intensity has a smaller curvature of the circular arc or the elliptical arc.

5. The optical scanning device according to claim 4, wherein
   the laser light source is formed of an edge-emitting laser, and
   the aperture opening is formed such that PAm>PAs is satisfied, where PAm is light intensity of an aperture opening edge in the main-scanning direction, PAs is light intensity of an aperture opening edge in the sub-scanning direction.

6. The optical scanning device according to claim 4, wherein
   the laser light source is formed of an edge-emitting laser array, and
   the aperture opening is formed such that PAs>PAm is satisfied, where PAm is light intensity of an aperture opening edge in the main-scanning direction, PAs is light intensity of an aperture opening edge in the sub-scanning direction.

7. The optical scanning device according to claim 4, wherein
   the laser light source is formed of either one of a surface-emitting laser and a surface-emitting laser array, and
   the aperture opening is formed such that PAs>PAm is satisfied, where PAm is light intensity of an aperture opening edge in the main-scanning direction, PAs is light intensity of an aperture opening edge in the sub-scanning direction.

8. The optical scanning device according to claim 2, wherein a shape of the aperture opening is an octagon.

9. The optical scanning device according to claim 8, wherein in an octagon shape of the aperture opening,
   if PAm>PAs, Bm>Bs, and
   if PAs>PAm, Bs>Bm, where PAm is light intensity of an aperture opening edge in a main-scanning direction, PAs is light intensity of an aperture opening edge in a sub-scanning direction, Bm is ratio of length of a line of the aperture opening parallel to the main-scanning direction to length of an edge of a rectangle circumscribing the aperture opening in the main-scanning direction, Bs is ratio of length of a line of the aperture opening parallel to the sub-scanning direction to length of an edge of the rectangle circumscribing the aperture opening in the sub-scanning direction.

10. The optical scanning device according to claim 9, wherein
the laser light source is formed of an edge-emitting laser, and
the aperture opening is formed such that PAm>PAs is satisfied, where PAm is light intensity of an aperture opening edge in the main-scanning direction, PAs is light intensity of an aperture opening edge in the sub-scanning direction.

11. The optical scanning device according to claim 9, wherein
the laser light source is formed of an edge-emitting laser array, and
the aperture opening is formed such that PAs>PAm is satisfied, where PAm is light intensity of an aperture opening edge in the main-scanning direction, PAs is light intensity of an aperture opening edge in the sub-scanning direction.

12. The optical scanning device according to claim 9, wherein
the laser light source is formed of either one of a surface-emitting laser and a surface-emitting laser array, and
the aperture opening is formed such that PAs>PAm is satisfied, where PAm is light intensity of an aperture opening edge in the main-scanning direction, PAs is light intensity of an aperture opening edge in the sub-scanning direction.

13. The optical scanning device according to claim 2, wherein a shape of at least a portion of the aperture opening is represented by $$z = b(1-(y/a)^{nz})^{(1/ny)}$$

where y is coordinate of a main-scanning direction, z is coordinate of a sub-scanning direction, 2b is diameter of the aperture opening in the sub-scanning direction, 2a is diameter of the aperture opening in the main-scanning direction, and nz and ny are positive integers.

14. The optical scanning device according to claim 13, wherein in the aperture opening,
if PAm>PAs, ny>nz, and
if PAs>PAm, nz>ny,
where PAm is light intensity of an aperture opening edge in the main-scanning direction and PAs is light intensity of an aperture opening edge in the sub-scanning direction.

15. The optical scanning device according to claim 14, wherein
the laser light source is formed of an edge-emitting laser, and
the aperture opening is formed such that PAm>PAs is satisfied, where PAm is light intensity of an aperture opening edge in the main-scanning direction, PAs is light intensity of an aperture opening edge in the sub-scanning direction.

16. The optical scanning device according to claim 14, wherein
the laser light source is formed of an edge-emitting laser array, and
the aperture opening is formed such that PAs>PAm is satisfied, where PAm is light intensity of an aperture opening edge in the main-scanning direction, PAs is light intensity of an aperture opening edge in the sub-scanning direction.

17. The optical scanning device according to claim 14, wherein
the laser light source is formed of either one of a surface-emitting laser and a surface-emitting laser array, and
the aperture opening is formed such that PAs>PAm is satisfied, where PAm is light intensity of an aperture opening edge in the main-scanning direction, PAs is light intensity of an aperture opening edge in the sub-scanning direction.

18. The optical scanning device according to claim 1, wherein the scanning lens is formed of a single lens.

19. An image forming apparatus that forms an electrostatic latent image on a photosensitive element, the image forming apparatus comprising:
an optical scanning device that scans a surface of the photosensitive element with a light beam, the optical scanning device including
a laser light source that emits a light beam,
a coupling lens that couples the light beam,
an aperture having an aperture opening that transmits a predetermined portion of the light beam,
a phase optical element that changes a phase of a portion of the light beam coupled by the coupling lens including a center of the light beam,
a deflecting unit that deflects the light beam transmitted through the aperture for scanning, and
a scanning lens that focuses the light beam deflected by the deflecting unit into a beam spot on a scanning surface, wherein
the phase optical element has a function of increasing a light intensity of a side-lobe of the scanning beam near the scanning surface,
the aperture opening is set to satisfy $$0.03 \leq (SR-SA)/SR \leq 0.20$$

where SR is area of a rectangle circumscribing the aperture opening and SA is area of the aperture opening, and
the function of the phase optical element and the aperture expand a depth allowance of the beam spot.

20. The image forming apparatus according to claim 19, wherein the photosensitive element includes a plurality of photosensitive elements on which electrostatic latent images of different colors are formed and developed into toner images with toners of corresponding colors, respectively, and the toner images are superimposed on a recording medium to form a full-color image.

* * * * *